(12) United States Patent
Gupta et al.

(10) Patent No.: US 11,963,095 B2
(45) Date of Patent: Apr. 16, 2024

(54) METHODS AND SYSTEMS FOR HANDLING NETWORK SLICE ADMISSION CONTROL FOR UE

(71) Applicant: Samsung Electronics Co., Ltd., Suwon-si (KR)

(72) Inventors: Varini Gupta, Bangalore (IN); Ashok Kumar Nayak, Bangalore (IN); Danish Ehsan Hashmi, Bangalore (IN); Hoyeon Lee, Suwon-si (KR); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 17/715,414

(22) Filed: Apr. 7, 2022

(65) Prior Publication Data

US 2022/0330143 A1 Oct. 13, 2022

(30) Foreign Application Priority Data

Apr. 9, 2021 (IN) .............................. 202141016819
Jan. 12, 2022 (IN) .............................. 2021 41016819

(51) Int. Cl.
*H04W 48/18* (2009.01)
*H04W 60/04* (2009.01)
*H04W 60/06* (2009.01)

(52) U.S. Cl.
CPC ........... *H04W 48/18* (2013.01); *H04W 60/04* (2013.01); *H04W 60/06* (2013.01)

(58) Field of Classification Search
CPC ...... H04W 48/18; H04W 60/04; H04W 60/06
See application file for complete search history.

(56) References Cited

U.S. PATENT DOCUMENTS

2019/0357129 A1 11/2019 Park et al.
2023/0062362 A1* 3/2023 Sun ....................... H04W 72/20
(Continued)

FOREIGN PATENT DOCUMENTS

WO 2018/236819 A1 12/2018

OTHER PUBLICATIONS

Matrixx, TR 32.847—"Solution for Key Issue #1 based on new charging service," S5-212124rev7, Mar. 9, 2021.
(Continued)

*Primary Examiner* — Luat Phung
(74) *Attorney, Agent, or Firm* — Jefferson IP Law, LLP

(57) ABSTRACT

The disclosure relates to a 5G or 6G communication system for supporting a higher data transmission rate. Methods and systems for handling network slice admission control for User Equipment (UE) are provided. The disclosure relates to network slicing and more particularly, to a system and method of ensuring that a communication system is able to accurately enforce quota on the maximum number of UEs concurrently registering for a network slice defined by a Single Network Slice Selection Assistance Information (S-NSSAI). The disclosure describes how the limits of "Number of Terminals" configured for an S-NSSAI may be accurately maintained in a Network Slice Admission Control Function (NSACF), and thus the enforcement may be performed when the limit is really exhausted. The disclosure also describes that a deregistration notification from a Unified Data Management (UDM) may act as a trigger for an old Mobility Management Function (AMF) to decrement counts in the NSACF as the old AMF is no longer serving the UE.

18 Claims, 15 Drawing Sheets

(56) References Cited

U.S. PATENT DOCUMENTS

| | | | | |
|---|---|---|---|---|
| 2023/0089325 A1* | 3/2023 | Chen | ............... | H04W 28/16 |
| | | | | 455/422.1 |
| 2023/0111943 A1* | 4/2023 | Maeda | ............... | H04L 41/12 |
| | | | | 370/254 |
| 2023/0189358 A1* | 6/2023 | Youn | ............... | H04W 80/10 |
| | | | | 370/328 |

OTHER PUBLICATIONS

3GPP; TSG CT; "Non-Access-Stratum (NAS) protocol for 5G System (5GS); Stage 3; (Release 17)" 3GPP TS 24.501 V17.2.0, Apr. 2, 2021.

3GPP; TSG CT; "5G System; Network Slice Selection Services; Stage 3 (Release 17)" 3GPP TS 29.531 V17.0.0, Mar. 30, 2021.

International Search Report and written opinion dated Jul. 6, 2022, issued in International Application No. PCT/KR2022/005053.

Indian Office Action dated Nov. 25, 2022, issued in Indian Application No. 202141016819.

* cited by examiner

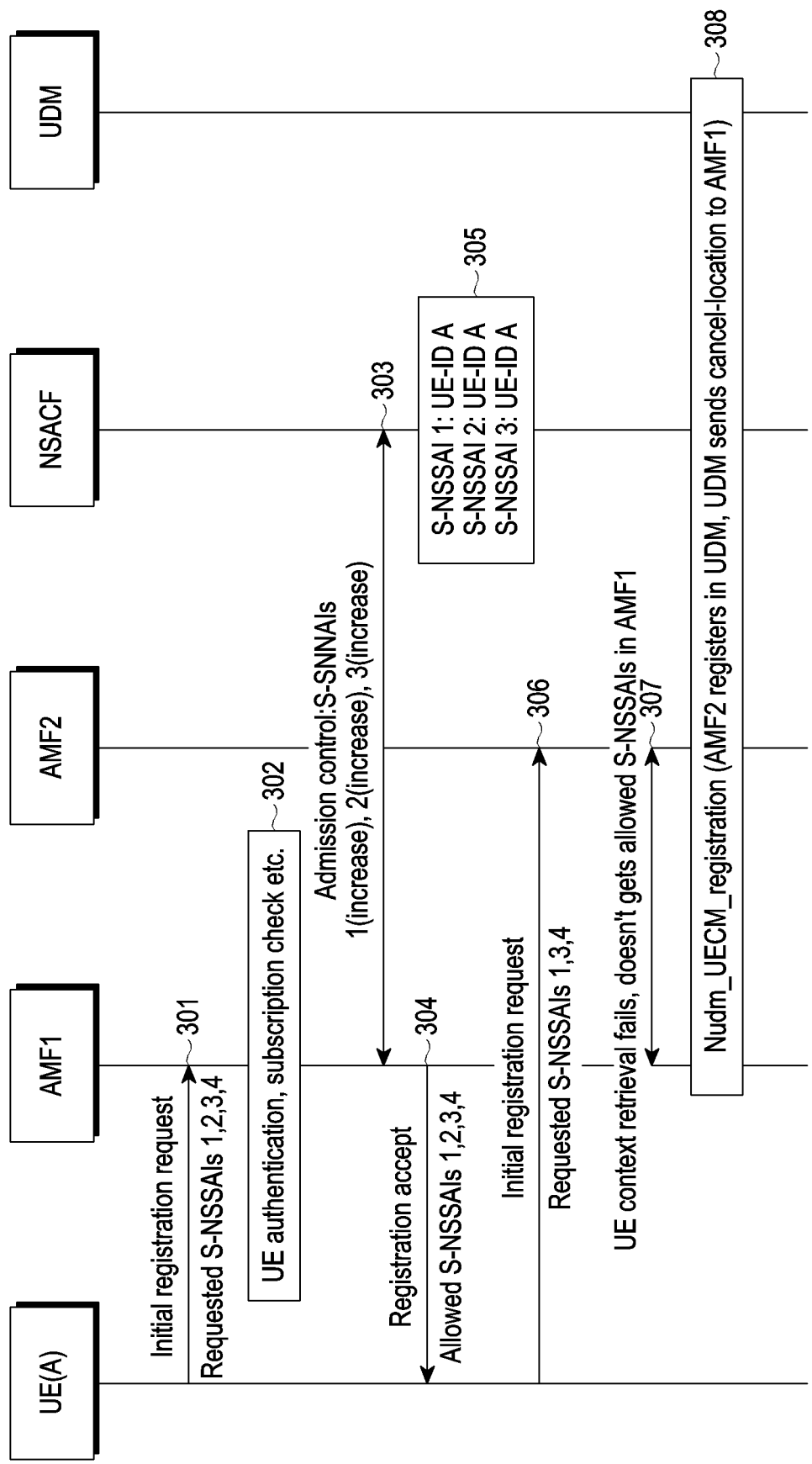

METHODS AND SYSTEMS FOR HANDLING NETWORK SLICE ADMISSION CONTROL FOR UE

CROSS-REFERENCE TO RELATED APPLICATION(S)

This application is based on and claims priority under 35 U.S.C. § 119(a) of an Indian provisional patent application number 202141016819, filed on Apr. 9, 2021, in the Indian Intellectual Property Office, and of an Indian Complete patent application number 202141016819, filed on Jan. 12, 2022, in the Indian Intellectual Property Office, the disclosure of each of which is incorporated by reference herein in its entirety.

BACKGROUND

1. Field

The disclosure relates to the field of wireless networks. More particularly, the disclosure relates to handling network slice admission control for a User Equipment (UE).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

3rd generation partnership project (3GPP) Release 15 introduced a concept of "network slicing," which allows telecom service providers to deploy an exclusive network for a customer (a Mobile Virtual Network Operator (MVNO), enterprise) or a service (for example, an enhanced Mobile Broadband (eMBB) service, an ultra-reliable low latency communications (URLLC) service, a massive internet of things (IoT) service, or the like) consisting of multiple network functions designed specifically to support a specialized service. A set of such network functions may be referred as network slices and identified using a Single Network Slice Selection Assistance Information (S-NSSAI) inside a 3$^{rd}$ Generation Partnership Project (3GPP) network.

The network slices may be characterized by a set of both standard and proprietary attributes as defined by a "slice template." Global System for Mobile Communications (GSM) defines a "Generic Network Slice Template (GST)," which provides standardized slice attributes for a set of services supported by the 3GPP network. One of attributes defined by the GST is a "number of terminals." The "number of terminals" describes a maximum number of terminals that may use the network slice simultaneously. The "number of terminals" may be an input in network planning, as operators have to ensure that resources the operators provide for the network slice are sufficient to handle the capacity specified by the "number of terminals" attribute.

To enforce the "number of terminals," the 3GPP defines a function entity "Network Slice Admission Control Function (NSACF)," which monitors and controls a number of User Equipments (UEs) registered to the network slice. The NSACF may be configured with the maximum number of UEs per network slice and may be expected to be consulted (by a core access and mobility management function (AMF)) while admitting a UE to the network. Such a process may be performed for all the network slices, which have been subjected to a "quota" defined by the "number of terminals." In 3GPP terminology, the "number of terminals" may refer to "number of UEs or number of registrations per access type." The terms such as "number of terminals," "number of UEs," "number of registrations per access type," and so on, are used interchangeably through the document.

As specified in the 3GPP TS 23.501 (Rel-17), the NSACF controls (i.e., increases or decreases) the current number of UEs registered for the network slice, so that the maximum number of UEs may be allowed to register with the network slice. The NSACF also maintains a list of UE identities (IDs) registered with the network slice that is subjected to an admission control. When the current number of UEs registered with the network slice is to be increased, the NSACF first checks whether the UE identity is already in the list of UEs registered with the network slice and if not the NSACF checks whether the maximum number of UEs per network slice for the network slice has already been reached.

The AMF triggers a request to the NSACF for the maximum number of UEs per network slice admission control when the UE's registration status for the network slice subject to the admission control may change, that is during a UE registration procedure, a UE deregistration procedure or during network slice-specific authentication and authorization procedures.

During a mobility of the UE between the AMFs, it may possible that the usage of the network slices by the UEs may not be accurately updated in the NSACF. Thus, resulting in the NSACF rejecting the admission of the UEs in the corresponding network slice even before the configured limit of "number of terminals" has been reached.

In the conventional approaches, in case of the UE mobility to a new AMF from an old AMF, the old AMF may provide the list of network slices used by the UE when the UE was registered in the old AMF. Thus, helping the new AMF to perform a decrease operation with the NSACF to ensure that the network slices that are no longer used by the UE are not getting counted towards overall quota of the NSACF. However, this may not address some scenarios, for example, when the UEs move across the AMFs without a context transfer. Such a scenario may happen when the new AMF does not support all the network slices supported by the previous AMF, or after the implicit de-registration, or after the UE performs a fresh initial registration with a Subscription Concealed Identifier (SUCI) in the new AMF. In all the above scenarios, the new AMF has no way to know the allowed S-NSSAIs for the UE in the previous/old AMF, so that the counts related to the S-NSSAIs may not be decreased. Thus, resulting in over-counting and may potentially result in the NSACF rejecting the registration of new subscribers even before the NSACF limits have been reached.

FIG. 1 depicts a representation of a sequence of events that may be performed in a typical-AMF change scenario due to a UE mobility involving admission control by the NSACF, according to the related art.

Referring to FIG. 1, at operation 101, a UE (A) sends a registration request to an AMF1. The registration request includes requested S-NSSAIs (for example, 1, 2, 3, 4) indicating the network slices the UE (A) wants to connect to.

At operation 102, the AMF1 authenticates the UE (A), registers itself in a Unified Data Management (UDM) by performing a Nudm_UECM_Registration procedure and performs a subscription check to determine the S-NSSAIs corresponding to the network slices the UE (A) is allowed to access. In an example herein, consider that the UE (A) is allowed to access all the network slices the UE (A) has requested. The AMF1 also determines that the S-NSSAIs 1, 2, 3 require the admission control, whereas the S-NSSAI 4 does not need admission control.

At operation 103, the AMF1 performs the admission control check with the NSACF by sending an admission control request to the NSACF to verify if the S-NSSAI 1, 2, 3 and the associated usages are under configured limits. In an example herein, consider that the usage is within the limit for the all the S-NSSAIs. The count for the S-NSSAIs may be increased by 1 for the S-NSSAIs 1, 2, 3.

At operation 104, the AMF1 sends a registration accept to the UE (A) with the allowed NSSAIs containing the S-NSSAIs 1, 2, 3, 4.

At operation 105, the NSACF may have the UE (A) counted against the S-NSSAI 1, 2, 3.

At operation 106, the UE (A) moves to an area served by an AMF2. In such a scenario, the UE (A) performs a mobile registration by sending the registration request to the AMF2 by including the S-NSSAIs 1, 2, 3, 4 for which the UE (A) requires an access.

At operation 107, consider that the AMF2 does not support the S-NSSAI 2, which may be due to new tracking areas not supporting the S-NSSAI 2, or might be due to the AMF2 not being part of the network slice corresponding to the S-NSSAI 2. Thus, the AMF2 may not be able to provide the S-NSSAI 2 in the allowed NSSAI when the AMF 2 sends the registration accept to the UE.

At operation 108, the AMF 2 retrieves a UE context from the AMF1 and determines that the S-NSSAI 2 was part of the allowed S-NSSAI sent to the UE by the AMF1.

At operation 109, the AMF2 registers itself into the UDM by performing the Nudm_UECM_Registration procedure, which triggers the UDM to send a cancel-location (Nudm_UECM_DeregistrationNotification) message to the AMF1. The cancel-location message indicates the AMF1 to locally delete the UE context corresponding to the UE (A).

At operation 110, the AMF2 performs the admission control check with the NSACF by sending the admission control request to increase counts for the S-NSSAI 1 and 3. The AMF2 also requests the NSACF to decrease the count for the S-NSSAI 2, as the AMF2 determines that the UE (A) was using the S-NSSAI 2 in the AMF1 from the allowed S-NSSAI received from the AMF 1 (operation 8), but is no longer used in the AMF2, Thereafter, the count in the NSACF remains the same for the S-NSSAIs 1 and 3 (as it was already present, but is decreased by 1 for the S-NSSAI 2). According to the conventional approaches, the counts corresponding to the S-NSSAI 2 may also be decremented by the AMF1, after the AMF1 determines that the S-NSSAI 2 is not allowed in the AMF2 (i.e., because the AMF2 does not support the S-NSSAI 2, or the UE (A) did not request for the S-NSSAI 2).

At operation 111, the AMF2 sends the registration accept to the UE (A) with the allowed S-NSSAIs containing the S-NSSAIs 1, 3, 4.

At operation 112, the NSACF may have the UE (A) counted against the S-NSSAI 1 and 3 in its database.

The above described procedure may work as long as the AMF2 (new AMF) may learn about the allowed S-NSSAI in the AMF1 (old AMF), or the AMF1 learns the unsupported S-NSSAIs in the AMF2 (new AMF). When the AMF2 (new AMF) may not be able to communicate with the AMF1 (old AMF) due to various reasons, it may not be able to decrease the count corresponding to the unused slice (S-NSSAI 2) in the NSACF. Thus, the NSACF may start rejecting subscribers on the S-NSSAI 2 even before the count of the S-NSSAI 2 reaches the configured limit, as depicted in FIG. 2.

FIG. 2 is a representation of a sequence of events during an AMF change scenario involving the admission control by the NSACF, highlighting over-counting in some scenarios, according to the related art.

Referring to FIG. 2, at operation 201, the UE (A) sends the registration request to the AMF1. The registration request includes the requested S-NSSAIs (for example, 1, 2, 3, 4) indicating the network slices the UE (A) wants to connect to.

At operation 202, the AMF1 authenticates the UE (A), registers itself in the UDM by performing the Nudm_UECM_Registration procedure and performs the subscription check to determine the S-NSSAIs the UE (A) is allowed to access. In an example herein, consider that the UE (A) is allowed to access all the network slices that the UE (A) has requested. The AMF1 also determines that the S-NSSAIs 1, 2, 3 require the admission control, whereas the S-NSSAI 4 does not require the admission control.

At operation 203, the AMF1 performs the admission control check with the NSACF by sending the admission control request to verify if the S-NSSAI 1, 2, and 3 usages are under the configured limits. In an example, consider that the S-NSSAI 1, 2, 3 usages are under the configured limits. In such a scenario, the AMF1 increases the count 1 for the S-NSSAIs 1, 2, 3.

At operation 204, the AMF1 sends the registration accept to the UE (A) with the allowed S-NSSAIs containing the S-NSSAIs 1, 2, 3, 4.

At operation 205, the NSACF may have the UE (A) counted against the S-NSSAI 1, 2, 3 in its database.

At operation 206, the UE (A) performs a fresh initial registration in the AMF2 (for example, with a Subscription Concealed Identifier (SUCI), a 5G—Globally Unique Temporary Identifier (GUTI), or any other identifier) and sends the requested-NSSAI containing S-NSSAIs 1, 3, 4.

At operation 207, the AMF2 does not retrieve the UE context from the AMF1, since the UE (A) performs the initial registration in operation 206, and the AMF2 does not even know that the UE (A) was registered in the AMF1 before, hence the AMF2 does not send a request to the AMF1 to retrieve the UE context.

At operation 208, the AMF2 now registers itself into the UDM by performing the Nudm_UECM_Registration procedure. The Nudm_UECM_Registration procedure triggers the UDM to send the cancel-location (Nudm_UECM_DeregistrationNotification) message to the AMF1, informing the AMF1 to locally delete the UE context corresponding to the UE (A).

At operation 209, the AMF2 performs the admission control check with the NSACF by sending the admission control request to increase counts for the S-NSSAI 1, 3. The count remains same for the S-NSSAIs 1, 3 (as the S-NSSAIs 1, 3 were already present). Since the AMF2 is unaware of the S-NSSAI 2, the AMF2 does not make any change regarding the S-NSSAI 2 in the NSACF. Similarly, since the AMF1 does not know that the UE (A) has moved to the AMF2, the AMF1 does not send any request to the NSACF to decrease count for the S-NSSAI 2.

At operation 210, the AMF2 sends the registration accept to the UE (A), with the allowed S-NSSAIs containing the S-NSSAIs 1, 3, 4.

At operation 211, the NSACF may have the UE (A) counted against the S-NSSAI 1, 2, 3 in its database, which is an issue as the UE (A) is no longer using the S-NSSAI 2, but the S-NSSAI 2 is still counted against the UE (A). The NSACF may start rejecting other subscribers on the S-NSSAI 2 even before the S-NSSAI 2 reaches the configured limit. A similar problem may occur if the UE (A) performs the mobility registration in operation 206, with the requested S-NSSAI set to isolated S-NSSAIs. That is, the UE (A) is being served by the AMF2 (new AMF), which is not allowed to communicate with the AMF1 (old-AMF). In such a scenario also, the counts corresponding to the S-NSSAI 2 may not be accurately decremented in the NSACF.

FIGS. 3A and 3B depict a representation of a sequence of events illustrating a behavior of a 5G system according to the related art, if the old AMF is allowed to perform the decrement of network slice-usage count after the UE moves out of its service and if the new AMF did not perform the admission check for the network slices the new AMF did not allow.

Referring to FIGS. 3A and 3B, at operation 301, the UE (A) sends the registration request to the AMF1. The registration request includes the requested S-NSSAIs (for example, 1, 2, 3, 4) indicating the network slices the UE (A) wants to connect to.

At operation 302, the AMF1 authenticates the UE, registers itself in the UDM by performing the Nudm_UECM_Registration procedure, and performs the subscription check to determine the S-NSSAIs the UE is allowed to access. In an example herein, consider that the UE is allowed to access all the slices that the UE has requested. The AMF1 also determines that the S-NSSAIs 1, 2, 3 require the admission control whereas the S-NSSAI 4 does not require the admission control.

At operation 303, the AMF1 performs the admission control check with the NSACF by sending the admission control request to verify if the S-NSSAIs 1, 2, 3 and usage of the S-NSSAIs 1, 2, 3 are under configured limits. In an example herein, consider that the usage of the S-NSSAIs 1, 2, 3 are under the configured limits. In such a case, the count for the S-NSSAIs 1, 2, 3 may be increased by 1.

At operation 304, the AMF1 sends the registration accept to the UE (A) with the allowed S-NSSAIs containing the S-NSSAIs 1, 2, 3, 4.

At operation 305, the NSACF database may have the UE (A) counted against the S-NSSAIs 1, 2, 3.

At operation 306, the UE (A) performs the fresh initial registration in the AMF2 (for example, using the SUCI, the 5G-GUTI, or any other identifier) and sends the requested S-NSSAI containing the S-NSSAIs 1, 3, 4.

At operation 307, the AMF2 does not receive the UE context from the AMF1, because the UE (A) performs the initial registration in operation 306 and the AMF2 does not know that the UE (A) was registered in the AMF1 before. Thus, the AMF2 does not send the request to the AMF1 to retrieve the UE context.

At operation 308, the AMF2 registers itself into the UDM by performing the Nudm_UECM_Registration procedure. The Nudm_UECM_Registration procedure triggers the UDM to send the cancel-location (Nudm_UECM_DeregistrationNotification) message to the AMF1, informing the AMF1 to locally delete UE context corresponding to the UE (A).

At operation 309, the AMF 2 performs the admission control check with the NSACF by sending the request to the NSACF to increase the counts for the S-NSSAIs 1, 3. The counts of the S-NSSAIs 1, 3 may remain same (as it was already present). Since the AMF2 does not have knowledge about the S-NSSAI 2, the AMF2 does not make any change regarding the S-NSSAI 2 in the NSACF. Similarly, since the AMF1 does not know that the UE (A) has moved to the AMF2, the AMF1 also does not send any request to decrease count for the S-NSSAI 2.

At operation 310, the NSACF may have the UE (A) counted against the S-NSSAIs 1, 2, and 3.

At operation 311, the AMF1 decides to de-register the UE (A) from its database, because of receiving the cancel-location (Nudm_UECM_DeregistrationNotification) message from the UDM in operation 8, or because the UE (A) did not perform any activity in the AMF1 for a long time, (for example, no Periodic Tracking Area Update (TAU)) due to which the AMF1 decided to implicitly deregister the UE (A). Since the AMF1 is unaware as to what S-NSSAIs are allowed in the new AMF (AMF2), the AMF1 simply triggers a request to decrement counts for all S-NSSAIs 1, 2, 3 in NSACF.

At operation 312, the AMF2 sends the registration accept to the UE with the allowed S-NSSAIs containing the S-NSSAIs 1, 3, 4, which may be performed before or after operation 311.

At operation 313, since the request from the AMF1 to decrement the counts may come after the request from the AMF2 to increment counts, the result is that the NSACF may now be in a situation whereby the NSACF does not count the UE (A) as accessing the S-NSSAIs 1, 3 even as the AMF has allowed the UE (A) to access the network slices. Thus, the 5G system ends up allowing more UEs to access certain network slices than the limits configured. Above call flows depict that the existing 5G system and methods are unable to accurately maintain the "number of terminals" parameter in the NSACF, when the UE moves to the AMF that is not able to communicate with the old AMF. Further, an accuracy of the NSACF may not be ensured, since the NSACF may over-count the number of UEs using a slice and start rejecting new registration even before the configuration limits/NSACF limits have been reached.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and system for managing network slice admission control for a User Equipment (UE).

Another aspect of the disclosure is to provide methods and systems for enabling a core entity to receive a registration request from the UE requesting for at least one Single Network Slice Selection Assistance Information (S-NSSAI) to connect to at least one respective network slice and perform an admission control check with a Network Slice Admission Control Function (NSACF) by sending an admission control request to the NSACF to manage at least one count for the requested at least one S-NSSAI serving by the core entity in a UE context information, wherein the admission control request includes an information element of the core entity, a UE identity, and the at least one S-NSSAI serving by the core entity.

Another aspect of the disclosure is to provide methods and systems for enabling the core entity to receive a de-registration notification or a cancel location message from a Unified Data Management (UDM), upon successful registration of the UE in another core entity and to send an admission control request including the information element of the core entity, the UE identity, and the at least one S-NSSAI previously served for the UE to the NSACF to decrement the at least one count for the corresponding at least one S-NSSAI.

Another aspect of the disclosure is to provide methods and systems for enabling the NSACF to manage the at least one count for the at least one S-NSSAI serving by the core entity in the UE context information based on at least the information element of the core entity indicated in the received admission control request and the UE identity.

Another aspect of the disclosure is to provide a method for managing network slice admission control for a User Equipment (UE), the method comprising: sending, by the UE, a registration request to a core entity requesting for at least one Single Network Slice Selection Assistance Information (S-NSSAI) to connect to at least one respective network slice; performing, by the core entity, an admission control check with a Network Slice Admission Control Function (NSACF) by sending an admission control request to the NSACF to manage at least one count for the requested at least one S-NSSAI served by the core entity in UE context information, wherein the admission control request includes an information element of the core entity, a UE identity, and the at least one S-NSSAI served by the core entity; managing, by the NSACF, the at least one count for the at least one S-NSSAI served by the core entity in the UE context information based on at least the information element of the core entity indicated in the received admission control request and the UE identity; and sending, by the core entity, a registration accept to the UE to connect to the at least one network slice corresponding to the at least one S-NSSAI served by the core entity.

In an embodiment, wherein the core entity includes an Access and Mobility Management Function (AMF).

In an embodiment, wherein the information element of the core entity includes at least one of an identifier (ID) identifying the core entity or an ID identifying the admission control request sent by the core entity to the NSACF.4.

In an embodiment, wherein the ID identifying the core entity includes at least one of a Globally Unique AMF ID (GUAMI) or a network function (NF)-instance ID, and wherein the ID identifying the admission control request includes at least one of a timestamp or a random number.

In an embodiment, wherein the UE context information includes the UE identity and a mapping of the at least one count of the at least one S-NSSAI with at least one information element of at least one core entity.

In an embodiment, wherein the managing, by the NSACF, of the at least one count for the at least one S-NSSAI served by the core entity comprises: checking if the at least one S-NSSAI and the UE identity indicated by the core entity in the admission control request are present in the UE context information, and creating a new entry in the UE context information by associating the at least one S-NSSAI indicated by the core entity with the information element of the core entity and the UE identity, if the at least one S-NSSAI and the UE identity indicated by the core entity are not present in the UE context information.

In an embodiment, wherein the checking if the at least one S-NSSAI and the UE identity indicated by the core entity are present in the UE context information comprises: checking if an information element mapped with the at least one S-NSSAI present in the UE context information is same as the information element received from the core entity, increasing or decreasing the at least one count of the at least one S-NSSAI present in the UE context information, based on the admission control request received from the core entity if the information element mapped with the at least one S-NSSAI present in the UE context information is same as the information element received from the core entity, and creating the new entry in the UE context information by associating the at least one S-NSSAI indicated by the core entity with the information element of the core entity and the UE identity if the information element mapped with the at least one S-NSSAI present in the UE context information is not same as the information element received from the core entity and the request is to increase the at least one count of the at least one S-NSSAI.

In an embodiment, wherein the managing, by the NSACF, of the at least one count for the at least one S-NSSAI served by the core entity (406a), on receiving the information element including a timestamp from the core entity comprises: creating a new entry in the UE context information by associating the at least one S-NSSAI indicated by the core entity in the admission control request with the timestamp received from the core entity; and deleting the at least one count of the at least one S-NSSAI indicated by the core entity in the UE context information if the at least one S-NSSAI indicated by the core entity is associated with a timestamp earlier than the timestamp received from the core entity.

In an embodiment, wherein if the UE has moved to a new core entity from the core entity due to mobility for the at least one S-NSSAI, the method further comprises: sending, by the core entity, an admission control request including the information element of the core entity and the at least one S-NSSAI previously served by the core entity for the UE to initiate the admission check with the NSACF to decrement the at least one count for the corresponding at least one S-NSSAI; and decrementing, by the NSACF, the at least one count of the at least one S-NSSAI previously served by the core entity in the UE context information with respect to the information element of the core entity and the UE identity.

In an embodiment, The method of claim 9, wherein the initiating, by the core entity, of the admission control check with the NSACF for deleting the at least one count of the at least one S-NSSAI previously served for the UE is based on: an absence of at least one activity by the UE in the core entity for a pre-defined time, or a cancel-location notification or a deregistration notification received from a Unified Data Management (UDM) associated with the core entity.

Another aspect of the disclosure is to provide a method for managing network slice admission control for a User Equipment (UE), the method comprising: sending, by a User Equipment (UE), a registration request including at least one Single Network Slice Selection Assistance Information (S-NSSAI) to a second core entity, when the UE registers with the second core entity on moving from a first core entity to the second core entity, wherein the at least one S-NSSAI is requested by the UE to connect to at least one respective network slice; sending, by a Unified Data Management (UDM), a cancel-location notification to the first core entity to de-register the UE with the first core entity, upon successful registration of the UE in the second core entity; de-registering, by the first core entity, the UE, based on the cancel-location notification received from the UDM; and performing, by the second core entity and the first core entity, increase or decrease operations on at least one count of at least one S-NSSAI in a Network Slice Admission Control Function (NSACF), when the UE is registered with the second core entity and de-registered from the first core entity.

Another aspect of the disclosure is to provide a method for managing network slice admission control for a User Equipment (UE), the method comprising: sending, by the UE, a first registration request to a first core entity, wherein the first registration request includes at least one Single Network Slice Selection Assistance Information (S-NSSAI) requested by the UE to connect to at least one respective network slice; determining, by the first core entity, that the UE is allowed to access the requested at least one S-NSSAI served by the first core entity; performing, by the first core entity, an admission control check with a Network Slice Admission Control Function (NSACF) by sending a first admission control request including a first information element, a UE identity and the at least one S-NSSAI served by the first core entity to the NSACF to check if usage of the at least one S-NSSAI served by the first core entity is under configured limits; creating, by the NSACF, UE context information for the UE by increasing the at least one count for the at least one S-NSSAI served by the first core entity and associating the at least one count of the at least one S-NSSAI with the first information element and the UE identity, on checking that the usage of the at least one S-NSSAI served by the first core entity is under the configured limits; sending, by the first core entity, a first registration accept to the UE to connect to the at least one network slice corresponding to the at least one S-NSSAI requested by the UE; sending, by the UE, a second registration request to a second core entity, when the UE performs a fresh registration with the second core entity due to mobility, wherein the second registration request includes the at least one S-NSSAI which is same or different from the at least one S-NSSAI sent in the first registration request; performing, by the second core entity, the admission control check with the NSACF by sending a second admission control request including a second information element and the at least one S-NSSAI served by the second core entity to the NSACF to update the at least one count for the at least one S-NSSAI served by the second core entity; updating, by the NSACF, the UE context information in response to the second admission control request by updating the at least one count for the at least one S-NSSAI served by the second core entity based on the at least one S-NSSAI received from the second core entity, the second information element, and the at least one count of the at least one S-NSSAI present in the context information of the UE with respect to the first information element; sending, by the second core entity, a second registration accept to the UE to connect to the at least one network slice corresponding to the at least one S-NSSAI served by the second core entity; sending, by a Unified Data Management (UDM), a de-registration notification or a cancel location to the first core entity upon successful registration of the UE in the second core entity; and, de-registering, by the first core entity, the UE from an associated database.

In an embodiment, further comprising: sending, by the first core entity, a third admission control request including the first information element, the UE identity, and the at least one S-NSSAI previously served by the first core entity for the UE to the NSACF to decrement the at least one count for the corresponding at least one S-NSSAI; and deleting, by the NSACF, the at least one count of the at least one S-NSSAI previously served by the first core entity in the context information of the UE with respect to the first information element.

Another aspect of the disclosure is to provide a communication network comprising: a User Equipment (UE) configured to: send a registration request to a core entity requesting for at least one Single Network Slice Selection Assistance Information (S-NSSAI) to connect to at least one respective network slice, wherein the core entity coupled to the UE is configured to: perform an admission control check with a Network Slice Admission Control Function (NSACF) by sending an admission control request to the NSACF to manage at least one count for the requested at least one S-NSSAI served by the core entity in UE context information, the admission control request including an information element of the core entity, a UE identity, and the at least one S-NSSAI served by the core entity; wherein the NSACF coupled to the core entity is configured to: manage the at least one count for the at least one S-NSSAI served by the core entity in the UE context information based on at least the information element of the core entity indicated in the received admission control request and the UE identity, and wherein the core entity is configured to: send a registration accept to the UE to connect to the at least one network slice corresponding to the at least one S-NSSAI served by the core entity.

Another aspect of the disclosure is to provide a core entity in a communication system, the core entity being configured to: receive a registration request from a User Equipment (UE) requesting for at least one Single Network Slice Selection Assistance Information (S-NSSAI) to connect to at least one respective network slice; and perform an admission control check with a Network Slice Admission Control Function (NSACF) by sending an admission control request to the NSACF to manage at least one count for the requested at least one S-NSSAI served by the core entity in UE context information, wherein the admission control request includes an information element of the core entity, a UE identity, and the at least one S-NSSAI served by the core entity.

In an embodiment, wherein the core entity is further configured to: receive a de-registration notification or a cancel location from a Unified Data Management (UDM), upon successful registration of the UE in another core entity, and send an admission control request including the information element of the core entity, a UE identity, and the at least one S-NSSAI previously served for the UE to initiate the admission check with the NSACF to decrement the at least one count for the corresponding at least one S-NSSAI, wherein the NSACF decrements the at least one count of the at least one S-NSSAI previously served by the core entity in the UE context information with respect to the information element of the core entity.

Another aspect of the disclosure is to provide a Network Slice Admission Control Function (NSACF) in a communication system, wherein the NSACF is configured to: receive an admission control request from a core entity to manage at least one count for at least one Single Network Slice Selection Assistance Information (S-NSSAI) S-NSSAI served by the core entity, when a User Equipment (UE) requests the core entity for the at least one S-NSSAI, wherein the admission control request includes an information element of the core entity, a UE identity, and the at least one S-NSSAI served by the core entity; and manage the at least one count for the at least one S-NSSAI served by the core entity in a UE context information based on at least the information element of the core entity indicated in the received admission control request and the UE identity.

In an embodiment, wherein the NSACF is further configured to: check if the at least one S-NSSAI and the UE identity indicated by the core entity in the admission control request are present in the UE context information, and create a new entry in the UE context information by associating the at least one S-NSSAI indicated by the core entity with the information element of the core entity, if the at least one S-NSSAI and the UE identity indicated by the core entity are not present in the UE context information.

In an embodiment, The NSACF of claim 18, wherein if the at least one S-NSSAI and the UE identity indicated by the core entity are present in the UE context information, the NSACF is further configured to: check if an information element mapped with the at least one S-NSSAI present in the UE context information is same as the information element received from the core entity, increase or decrease the at least one count of the at least one S-NSSAI present in the UE context information, based on the admission control request received from the core entity, if the information element mapped with the at least one S-NSSAI present in the UE context information is same as the information element received from the core entity, and create the new entry in the UE context information by associating the at least one S-NSSAI indicated by the core entity with the information element of the core entity and the UE identity, if the information element mapped with the at least one S-NSSAI present in the UE context information is not same as the information element received from the core entity and the request is to increase the at least one count of the at least one S-NSSAI.

In an embodiment, wherein the NSACF is further configured to: receive an admission control request from the core entity including the information element of the core entity, the UE identity, and the at least one S-NSSAI previously served by the core entity for the UE to decrement the at least one count for the corresponding at least one S-NSSAI, upon a successful registration of the UE in another core entity, and decrement the at least one count of the at least one S-NSSAI previously served by the core entity in the UE context information with respect to the information element of the core entity, and the UE identity.

Another aspect of the disclosure is to provide a method of a core entity in a communication system, the method comprising: receiving, from a User Equipment UE, a registration request requesting for at least one Single Network Slice Selection Assistance Information (S-NSSAI) to connect to at least one respective network slice; and performing an admission control check with a Network Slice Admission Control Function (NSACF) by sending an admission control request to the NSACF to manage at least one count for the requested at least one S-NSSAI served by the core entity in UE context information, wherein the admission control request includes an information element of the core entity, a UE identity, and the at least one S-NSSAI served by the core entity.

Another aspect of the disclosure is to provide a method of a Network Slice Admission Control Function (NSACF) in a communication system, the method comprising: receiving, from a core entity, an admission control request to manage at least one count for at least one Single Network Slice Selection Assistance Information (S-NSSAI) S-NSSAI served by the core entity, when a User Equipment (UE) requests the core entity for the at least one S-NSSAI, wherein the admission control request includes an information element of the core entity, a UE identity, and the at least one S-NSSAI served by the core entity; and managing the at least one count for the at least one S-NSSAI served by the core entity in a UE context information based on at least the information element of the core entity indicated in the received admission control request and the UE identity.

Another aspect of the disclosure is to provide a core entity in a communication system, wherein the core entity is configured to: receive a registration request from a User Equipment (UE) requesting for at least one Single Network Slice Selection Assistance Information (S-NSSAI) to connect to at least one respective network slice; and perform an admission control check with a Network Slice Admission Control Function (NSACF) by sending an admission control request to the NSACF to manage at least one count for the requested at least one S-NSSAI served by the core entity in UE context information, wherein the admission control request includes an information element of the core entity, a UE identity, and the at least one S-NSSAI served by the core entity.

Another aspect of the disclosure is to provide a Network Slice Admission Control Function (NSACF) in a communication system, wherein the NSACF is configured to: receive an admission control request from a core entity (406a-406n) to manage at least one count for at least one Single Network Slice Selection Assistance Information (S-NSSAI) S-NSSAI served by the core entity, when a User Equipment (UE) requests the core entity for the at least one S-NSSAI, wherein the admission control request includes an information element of the core entity, a UE identity, and the at least one S-NSSAI served by the core entity; and manage the at least one count for the at least one S-NSSAI served by the core entity in a UE context information based on at least the information element of the core entity indicated in the received admission control request and the UE identity.

Additional aspects will be set forth in part in the description which follows and, in part, will be apparent from the description, or may be learned by practice of the presented embodiments.

In accordance with an aspect of the disclosure, methods and systems for managing network slice admission control for a User Equipment (UE) are provided. The method includes sending, by the UE, a registration request to a core entity requesting for at least one Single Network Slice Selection Assistance Information (S-NSSAI) to connect to at least one respective network slice. The method includes performing, by the core entity, an admission control check with a Network Slice Admission Control Function (NSACF) by sending an admission control request to the NSACF to manage at least one count for the requested at least one S-NSSAI serving by the core entity in UE context information, wherein the admission control request includes an information element of the core entity, a UE identity, and the at least one S-NSSAI serving by the core entity. The method further includes managing, by the NSACF, the at least one count for the at least one S-NSSAI serving by the core entity in the UE context information based on at least the information element of the core entity indicated in the received admission control request and the UE identity. The method further includes sending, by the core entity, a registration accept to the UE to connect to the at least one network slice corresponding to the at least one S-NSSAI serving by the core entity.

In accordance with another aspect of the disclosure, a communication system is provided. The communication system includes a User Equipment (UE), a core entity, and a Network Slice Admission Control Function (NSACF). The UE is configured to send a registration request to a core entity requesting for at least one Single Network Slice Selection Assistance Information (S-NSSAI) to connect to at least one respective network slice. The core entity coupled to the UE is configured to perform an admission control check with the NSACF by sending an admission control request to the NSACF to manage at least one count for the requested at least one S-NSSAI serving by the core entity in UE context information, wherein the admission control request includes an information element of the core entity, a UE identity, and the at least one S-NSSAI serving by the core entity. The NSACF coupled to the core entity is configured to manage the at least one count for the at least one S-NSSAI serving by the core entity in the UE context information based on at least the information element of the core entity indicated in the received admission control request and the UE identity. The core entity is configured to send a registration accept to the UE to connect to the at least one network slice corresponding to the at least one S-NSSAI serving by the core entity.

Other aspects advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A and 3B are a representation of a sequence of events during AMF change scenario involving admission-control by NSACF, highlighting under-counting in some scenarios, according to the related art;

The same reference numerals are used to represent the same elements throughout the drawings.

DETAILED DESCRIPTION

Figure 1:
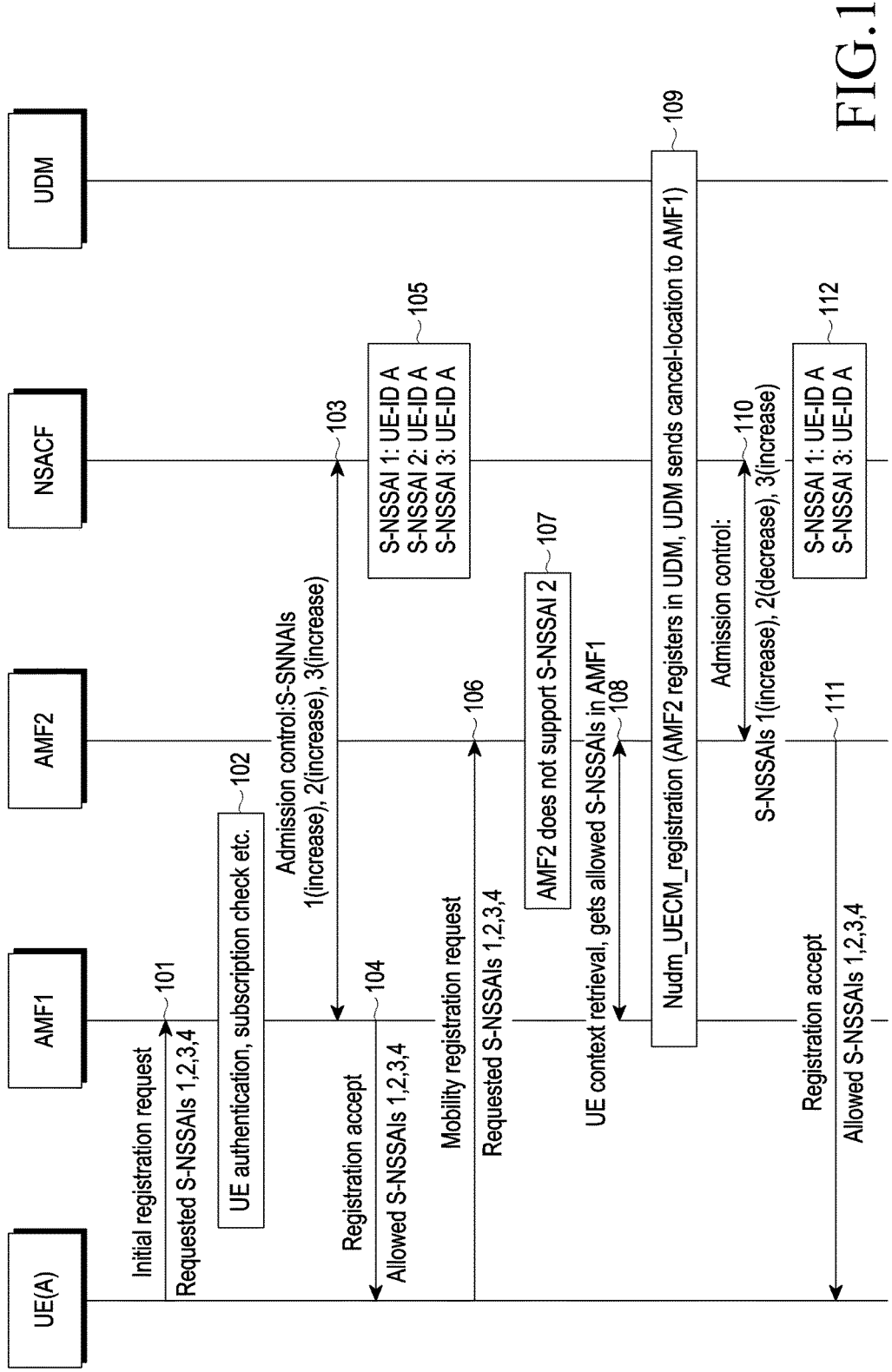
FIG. 1 is a representation of a sequence of events during a typical core access and mobility management function (AMF) change scenario involving an admission control by Network Slice Admission Control Function (NSACF), according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for managing network slice admission control for a User Equipment (UE) by:

allowing both an old access and mobility management function (AMF) and a new AMF to perform Network Slice Admission Control Function (NSACF) decrease operations for counts of Single Network Slice Selection Assistance Information (S-NSSAIs) the old AMF and the new AMF increased;

allowing the old AMF and the new AMF to include an information element (IE)/network function (NF)-identifier (ID) in the NSACF interactions; and allowing the old AMF to trigger the NSACF to decrease counts upon receiving a deregistration notification.

Referring now to the drawings, and more particularly to FIGS. 4 through 13, where similar reference characters denote corresponding features consistently throughout the figures, there are shown various embodiments.

Figure 4:
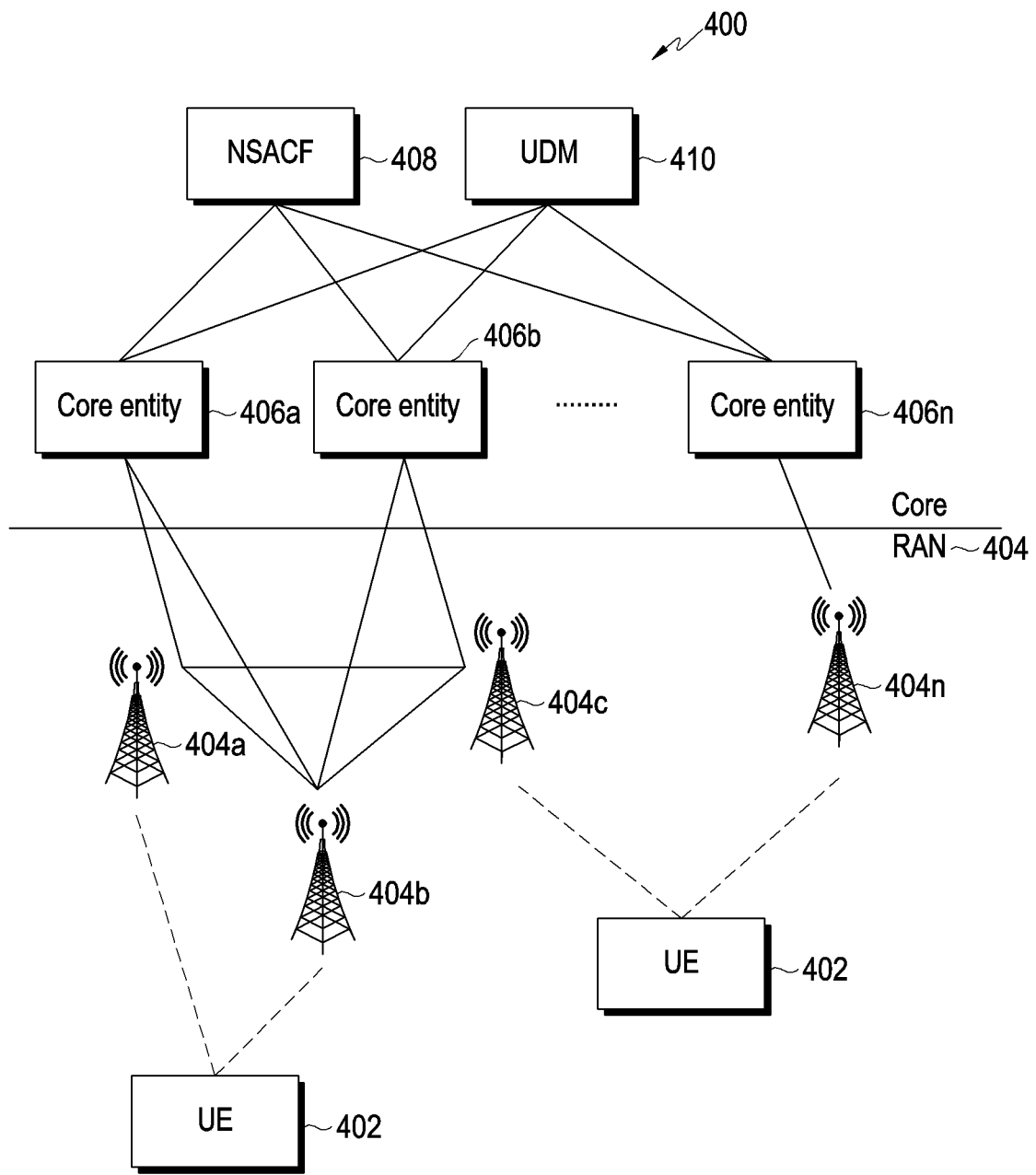
FIG. 4 depicts a communication system/network, according to an embodiment of the disclosure.

FIG. 4 depicts a communication system/network 400, according to an embodiment of the disclosure. The communication system 400 referred herein may provide an enterprise/customer with network functions that have been designed specifically to support specialized services. Examples of the specialized services may be, but are not limited to, an enhanced Mobile Broadband (eMBB) service, an ultra-reliable low latency communications (URLLC) service, a massive IoT service, a massive machine type communication (mMTC) service, and so on. A set of network functions may be referred as a network slice. The network slice may be identified/accessed using a Single Network Slice Selection Assistance Information (S-NSSAI) inside a $3^{rd}$ Generation Partnership Project (3GPP) network. The network functions, the network slice, and the S-NSSAI may be defined in accordance with the $3^{rd}$ Generation Partnership Project (3GPP) specification TS 23.501.

The communication system 400 includes one or more User Equipments (UEs) 402, a Radio Access Network (RAN) 404, core entities 406a, 406b, . . . 406n, a Network Slice Admission Control Function (NSACF) 408, and a Unified Data Management (UDM) 410.

The UE(s) 402 referred herein may be a user device that is capable of accessing the one or more network slices for the specialized services. Examples of the UE 402 may be, but are not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wi-Fi router, a Universal Serial Bus (USB) dongle, a robot, an auto-guided vehicle, or any other device capable of accessing the one or more network slices. The UE 402 may comprise of one or more processors/Central Processing Units (CPUs), a memory, a storage, a transceiver, and so on, for performing at least one intended function/operation.

The UE 402 may connect to one of the plurality of core entities 406a-406n through the RAN 404 for accessing the network slices for the specialized services. The UE 402 may also connect to the one of the plurality of core entities 406a-406n through the RAN 404 for accessing normal communication services. Examples of the communication services may be, but are not limited to, voice based services, data based services, and so on. Examples of the data based services may be, but not limited to, surfing the Internet, chat sessions, map based services, Voice over Internet Protocol (IP) (VoIP), and so on.

The RAN 404 may be configured to perform radio resource management functions such as, but are not limited to, radio bearer control, radio admission control, connection mobility control, dynamic allocation of resources to the UE 402 in an uplink/downlink (scheduling), and so on. The RAN 404 may comprise of radio nodes/Base Stations (BSs) 404a, 404b, 404c, . . . -404n such as, but are not limited to, evolved nodes B (eNBs), New Radio (next generation)

nodes B (gNBs), and so on. The radio nodes 404a-404n may support at least one of different Radio Access Technologies (RATs). Examples of the RATs may be, but are not limited to, a 3GPP 3rd Generation (3G), Long Term Evolution (LTE)/4$^{th}$ generation (4G), LTE-Advanced (LTE-A), 5$^{th}$ Generation (5G) New Radio (NR), a Universal Mobile Telecommunications Service (UMTS), a Global System for Mobile Communications (GSM) Enhanced Data rates for GSM Evolution (EDGE) Radio Access Network (GERAN) system Wireless Local Area Network (WLAN), Worldwide Interoperability for Microwave Access (WiMAX/IEEE 802.16), Wi-Fi (IEEE 802.11), Evolved-UMTS terrestrial radio access (UTRA) (E-UTRA), or any other next generation network. The one or more radio nodes 404a-404n may connect the UE 402 to the core entities 406a-406n.

Figure 5:
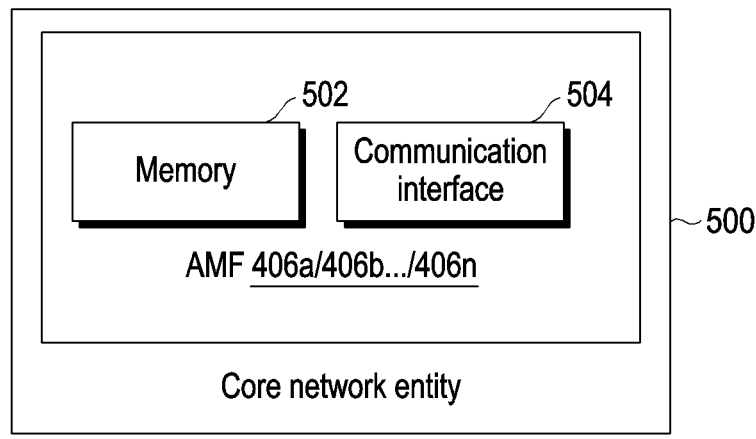
FIG. 5 is a block diagram depicting various components of the core network (CN) Entity, wherein the CN Entity is part of a $5^{th}$ generation (5G) core (5GC), according to an embodiment of the disclosure.

The core entities 406a-406n are components of core networks. An example core network (CN) 500 is depicted in FIG. 5. The CN 500 may comprise one of, but is not limited to, an Evolved Packet Core (EPC), a 5G core (5GC) network, and so on.

The CN 500 may be connected to the RAN 404 and an external data network (not shown) over the interface (the radio interface or the non-radio interface) supported by the associated RAT. Examples of the external data network may be, but are not limited to, the Internet, a Packet Data Network (PDN), an Internet Protocol (IP) Multimedia Core Network Subsystem, and so on. The CN 500 connects the UE(s) 402 (connected to the associated RAN 404) to the external data network for the communication services.

The core entity (406a-406n) may depend on a type of the CN 500. For example, if the CN 500 is a 5GC, the core entity (406a-406n) may include a core access and mobility management function (AMF). The core entity (406a-406n) may be configured to perform at least one of, registration management, connection management, reachability management, mobility management and various functions relating to security and access management and authorization.

In an embodiment, the core entity (406a-406n) may be configured to admit/reject the UE(s) 402 to/from connecting to the one or more network slices corresponding to the one or more S-NSSAIs requested by the UE 402 and served by the core entity (406a-406n). The core entity (406a-406n) may admit/reject the UEs 402 by checking a subscription of the UE 402 for the S-NSSAIs and communicating with the NSACF 408 to check whether counts of the S-NSSAIs have been reached configured limits or not. The configured limits depict a maximum number of terminals/UEs that may use the network slice simultaneously. In an example, the configured limits may be defined by a Generic Network Slice Template (GST). Embodiments herein use the terms such as "number of terminals," "number of UEs," "number of registrations per access type," and so on, interchangeably used through the document.

In another embodiment, the core entity (406a-406n) may be configured to perform an admission control check with the NSACF 408 to increase or decrease count of the S-NSSAIs serving by the core entity (406a-406n), on admitting the UE 402 to connect/access the network slices corresponding to the S-NSSAIs served by the core entity (406a-406n).

The NSACF 408 may be configured to monitor and control the number of UEs 402 that may be registered to each network slice. The NSACF 408 may be configured with a maximum number of UEs per network slice. The NSACF 408 controls (i.e., increases or decreases) the current number of UEs 402 registered for the network slice, so that the maximum number of UEs may be allowed to register with the network slice. The NSACF also maintains a list of UE identities (IDs) registered with the network slice that is subjected to an admission control.

The UDM 410 may be configured to perform service and access authorization for subscribers/UEs, ensuring that the UEs only have access to their subscribed services.

Embodiments herein enable the communication system 400 to manage network slice admission control for the UE(s) 402. The network slice admission control refers to admitting/rejecting the UE 402 to access the network slice.

When the UE 402 wants to connect to the one or more network slices, the UE 402 sends a registration request to the core entity (for example, the core entity 406a) (i.e., a currently serving core entity). The registration request includes the one or more S-NSSAIs corresponding to the one or more network slices with which the UE 402 wants to connect to. On receiving the registration request from the UE 402, the core entity 406a registers itself in the UDM 410 and performs an authentication and subscription check to determine if the UE 402 is allowed to access the requested one or more S-NSSAIs that are being serving by the core entity 406a. In an example herein, the core entity 406a may register itself in the UDM 410 using at least one of, a Subscription Permanent Identifier (SUPI), a 5G Globally Unique Temporary Identifier (GUTI), or the like. In an example, the core entity 406a may register itself in the UDM 410 using a Nudm_UECM_Registration procedure. The core entity 406a performs the authentication and subscription check in accordance with the 3GPP specification.

In an embodiment, if the UE 402 has moved to the core entity 406a from another core entity (406b-406n) (referred as an old core entity), the core entity (406a-406n) may or may not retrieve a context of the UE 402 (referred hereinafter as a UE context) from the old core entity (406b-406n). The UE context includes the S-NSSAIs that have been allowed for the UE 402 to access by the old core entity (406b-406n).

On determining that the UE 402 is allowed to access the requested one or more S-NSSAIs that are being serving by the core entity 406a, the core entity 406a performs an admission control check with the NSACF 408 to verify if the usage of the one or more S-NSSAIs are under the configured limits and accordingly manage a count of the requested one or more S-NSSAIs that are being serving by the core entity 406a in UE context information. In an example herein, consider that the usage of the one or more S-NSSAIs are under the configured limits. The core entity 406a performs the admission control check by sending an admission control request to the NSACF 408. In an embodiment, the admission control request includes an information element of the core entity, a UE identity/user identity, and the at least one S-NSSAI serving by the core entity. The information element of the core entity 406a includes at least one of, an identifier (ID) identifying the core entity 406a, or an ID identifying the admission control request sent by the core entity 406a to the NSACF 408. The ID identifying the core entity 406a including at least one of, a Globally Unique AMF ID (GUAMI), or a network function (NF)-instance ID. The ID identifying the admission control request includes at least one of, a timestamp or a random number. In an example herein, the timestamp may indicate the core entity's last Non-Access Stratum (NAS) connection with the UE 402. The UE context information may be maintained by the NSACF 408 in a NSACF database (not shown). The UE context information includes a mapping of the one or more S-NSSAIs with the information element of the core entity 406a and the UE identity.

On receiving the admission control request, the NSACF 408 manages the count of the one or more S-NSSAIs serving by the core entity 406*a* in the UE context information based on at least one of, the information element of the core entity 406*a* indicated in the received admission control request and the UE identity.

For managing the count of the one or more S-NSSAIs, the NSACF 408 checks if the one or more S-NSSAIs and the UE identity indicated by the core entity 406*a* in the admission control request is present in the UE context information. If the one or more S-NSSAIs and the UE identity indicated by the core entity (406*a*-406*n*) are not present in the UE context information, the NSACF 408 creates a new entry in the UE context information by associating the one or more S-NSSAIs indicated by the core entity (406*a*-406*n*) with the information element of the core entity (406*a*-406*n*) and the UE identity.

If the one or more S-NSSAIs indicated by the core entity 406*a* and the UE identity is present in the UE context information, the NSACF 408 checks if an information element mapped with the one or more S-NSSAIs present in the UE context information is same as the information element received from the core entity 406*a*. If the information element mapped with the one or more S-NSSAIs present in the UE context information is same as the information element received from the core entity 406*a*, the NSACF 408 updates the count of the one or more S-NSSAIs present in the UE context information, based on the admission control request received from the core entity. Updating the count of the one or more S-NSSAIs includes increasing the count of the one or more S-NSSAIs, if the admission control request is to increase the count of the one or more S-NSSAIs. Updating the count of the one or more S-NSSAIs includes decreasing the count of the one or more S-NSSAIs, if the admission control request is to decrease the count of the one or more S-NSSAIs.

If the information element mapped with the at least one S-NSSAI present in the UE context information is not same as the information element received from the core entity 406*a* and the request is to increase the count of the one or more S-NSSAIs, the NSACF 408 creates the new entry in the UE context information by associating the at least one S-NSSAI indicated by the core entity with the information element of the core entity 406*a* and the UE identity.

In an example herein, consider that the information element of the core entity 406*a* includes a timestamp depicting the core entity's last NAS connection with the UE 402. In such a scenario, for managing the count of the one or more S-NSSAIs, the NSACF 408 creates the new entry in the UE context information by associating the one or more S-NSSAIs indicated by the core entity 406*a* in the admission control request with the timestamp received from the core entity 406*a* and the UE identity. The NSACF 408 deletes the count of the one or more S-NSSAIs indicated by the core entity 406*a* in the UE context information, if the one or more S-NSSAIs indicated by the core entity 406*a* are associated with a timestamp earlier to the timestamp received from the core entity 406*a*.

On performing the admission control check with the NSACF 408, the core entity 406*a* sends the registration accept to the UE 402 to connect to the one or more network slices corresponding to the one or more S-NSSAIs serving by the core entity 406*a*.

The UE 402 may move from the core entity 406*a* to another core entity/new core entity (406*b*-406*n*) due to mobility. Further, the UE performs a fresh initial registration in the new core entity (406*b*-406*n*) for accessing the one or more S-NSSAIs. In such a scenario, the new core entity (406*b*-406*n*) registers itself in the UDM 410 (for example, using the SUPI, the 5G GUTI, or the like). Registering by the new core entity (406*b*-406*n*) in the UDM 410 triggers the UDM 410 to send a cancel-location message/notification (Nudm_UECM_DeregistrationNotification) or a deregistration notification to the core entity 406*a* (i.e., the old core entity now, since the core entity 406*a* is not serving the UE 402). The cancel-location notification or the deregistration notification indicates the core entity/old core entity 406*a* to deregister the UE 402.

On receiving the cancel-location notification or the deregistration notification, the core entity/old core entity 406*a* deregisters the UE 402 from an associated database (not shown). Alternatively, the core entity/old core entity 406*a* may deregister the UE 402, on detecting the absence of one or more activities by the UE 402 in the core entity/old core entity 406*a* for a pre-defined time. On deregistering the UE 402, the core entity/old core entity 406*a* may initiate the admission control check with the NSACF 408 for decrementing the count of the one or more S-NSSAIs previously served by the core entity 402*a* by sending the admission control request to the NSACF 408. The admission control request includes the one or more S-NSSAIs previously served by the core entity 406*a*, the information element of the core entity 406*a*, and the UE identity. On receiving the admission control request from the core entity 406*a*, the NSACF 408 decrements the count of the one or more S-NSSAIs previously served by the core entity 406*a* in the UE context information with respect to the information element of the core entity 406*a* and the UE identity.

Thus, embodiments herein ensure that the communication system 400 is able to accurately enforce quota on the maximum number of UEs concurrently registering for the network slice defined by the S-NSSAI.

FIG. 4 shows blocks of the communication system 400, but it is to be understood that other embodiments are not limited thereon according to an embodiment of the disclosure.

Referring to FIG. 4, the communication system 400 may include a greater or lesser number of blocks. Further, the labels or names of the blocks are used only for illustrative purpose and does not limit the scope of the embodiments herein. One or more blocks can be combined together to perform same or substantially similar function in the communication system 400.

FIG. 5 is a block diagram depicting various components of the CN Entity 500, wherein the CN Entity 500 is part of 5GC, according to an embodiment of the disclosure.

Referring to FIG. 5, the CN Entity 500 includes a memory 502, and a communication interface 504. In an embodiment herein, the CN Entity 500 may be part of an AMF 406*a* (an example of the core entities 406*a*-406*n*).

The memory 502 may store information related to at least one of, but is not limited to, the registration request received from the UEs 402, the S-NSSAIs allowed for each UE 402, and so on.

The communication interface 504 may be configured to enable the CN 500 to communicate with at least one of, the UE(s) 402, the RANs 404, the NSACF 408, and so on, over the interface supported by the respective RAT. Examples of the interface may be at least one of a wired or wireless fronthaul interface, a wired/non-radio or wireless/radio interface, or any structure supporting communications over a wired or wireless connection.

The AMF 406*a* may be configured to perform the admission control check with the NSACF 408 for admitting/ rejecting the UE 402 to access the network slices corresponding to the one or more S-NSSAIs requested by the UE 402.

Figure 6:
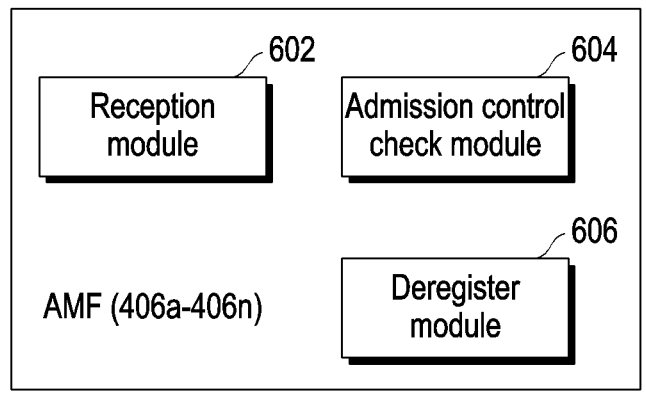
FIG. 6 depicts components of an AMF in the CN for managing a network slice admission control for a User Equipment (UE), according to an embodiment of the disclosure.

FIG. 6 depicts components of an AMF in the CN for managing a network slice admission control for a User Equipment (UE), according to an embodiment of the disclosure.

Referring to FIG. 6, the AMF 406a further includes a reception module 602, an admission control check module 604, and a deregister module 606.

The reception module 602 may be configured to receive the registration request from the UE 402, which indicates the one or more S-NSSAIs requested by the UE 402 to connect to the respective one or more network slices.

The admission control check module 604 may be configured to perform the authentication and subscription check to determine if the UE 402 is allowed to access the requested S-NSSAIs that are being serving by the AMF 406a. On determining that the UE 402 is allowed to access the requested S-NSSAIs that are being serving by the AMF 406a, the admission control check module 604 performs the admission control check with the NSACF 408 by sending the admission control request to the NSACF 408 for increasing or decrementing the count of the one or more S-NSSAIs that are being serving by the AMF 406a in the UE context information. The admission control request includes the information element of the AMF 406a, the UE identity and the one or more S-NSSAIs.

The deregister module 606 may be configured to deregister the UE 402 on determining successful registration of the UE 402 in another/new AMF (e.g., 406b-406n). The deregister module 606 may determine the successful registration of the UE 402 in another/new AMF (e.g., 406b-406n) on receiving the deregistration notification or the cancel-location notification from the UDM 410 or based on the absence of the activities of the UE 402 in the AMF 406a for the pre-defined time. On deregistering the UE 402, the deregister module 606 enables the admission control check module 604 to perform the admission control check with the NSACF 408 for decrementing the count of the one or more S-NSSAIs serving by the AMF 406a in the UE context information.

FIGS. 5 and 6 show blocks of the CN 500, but it is to be understood that other embodiments are not limited thereon. In other embodiments, the CN 500 may include a greater or lesser number of blocks. Further, the labels or names of the blocks are used only for illustrative purpose and does not limit the scope of the embodiments herein. One or more blocks can be combined together to perform same or substantially similar function in the CN 500.

Figure 7:
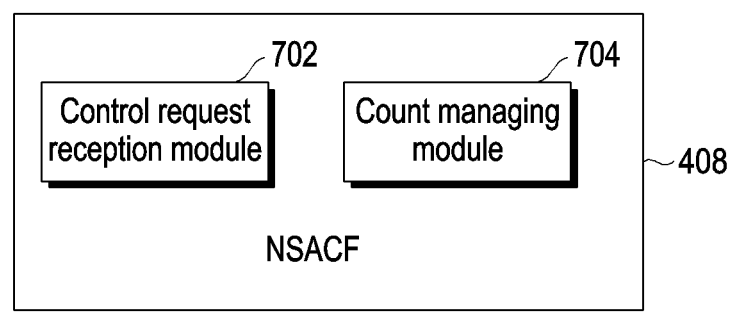
FIG. 7 is a block diagram depicting various components of a NSACF for managing a count of one or more Single Network Slice Selection Assistance Information (S-NSSAIs) in UE context information, according to an embodiment of the disclosure.

FIG. 7 is a block diagram depicting various components of the NSACF 408 for managing the count of the one or more S-NSSAIs in the UE context information, according to an embodiment of the disclosure.

Referring to FIG. 7, the NSACF 408 includes a control request reception module 702, and a count managing module 704. The NSACF 408 may also be coupled with the NSACF database (not shown) for maintaining the UE context information for the network slice admission control.

The control request reception module 702 may be configured to receive the admission control request from the one of the core entities/AMFs (406a-406n). The admission control request includes the information element of the core entity (406a-406n), the UE identity and the one or more S-NSSAIs for which the count has to be increased or decreased.

The count managing module 704 may be configured to manage the count of the S-NSSAIs in the UE context information based on the admission control request received from the core entity (406a-406n). The count managing module 704 checks if the one or more S-NSSAIs indicated by the core entity (406a-406n) and the UE identity in the admission control request is present in the UE context information. If the one or more S-NSSAIs and the UE identity indicated by the core entity are not present in the UE context information, the count managing module 704 creates the new entry in the UE context information by associating the one or more S-NSSAIs indicated by the core entity with the information element of the core entity (406a-406n) and the UE identity.

If the one or more S-NSSAIs and the UE identity indicated by the core entity (406a-406n) are present in the UE context information, the count managing module 704 checks if the information element mapped with the one or more S-NSSAIs present in the UE context information is same as the information element received from the core entity (406a-406n). If the information element mapped with the one or more S-NSSAIs present in the UE context information is same as the information element received from the core entity (406a-406n), the count managing module 704 increases or decrements the count of the one or more S-NSSAIs present in the UE context information with respect to the information element of the core entity (406a-406n), based on the received admission control request. If the information element mapped with the one or more S-NSSAIs present in the UE context information is not same as the information element received from the core entity (406a-406n) and the request is to increase the count of the one or more S-NSSAIs, the count managing module 704 creates the new entry in the UE context information by associating the one or more S-NSSAIs indicated by the core entity with the information element of the core entity (406a-406n) and the UE identity.

Alternatively, for managing the count of the one or more S-NSSAIs, the count managing module 704 creates the new entry in the UE context information by associating the one or more S-NSSAIs indicated by the core entity (406a-406n) in the admission control request with the information element of the core entity (406a-406n) and the UE identity. The count managing module 704 deletes the count of the one or more S-NSSAIs indicated by the core entity (406a-406n) in the UE context information, if the one or more S-NSSAIs indicated by the core entity (406a-406n) are associated with the information element older than the information element received from the core entity (406a-406n). In an embodiment herein, the information element received from the core entity (406a-406n) includes the timestamp.

Figure 8:
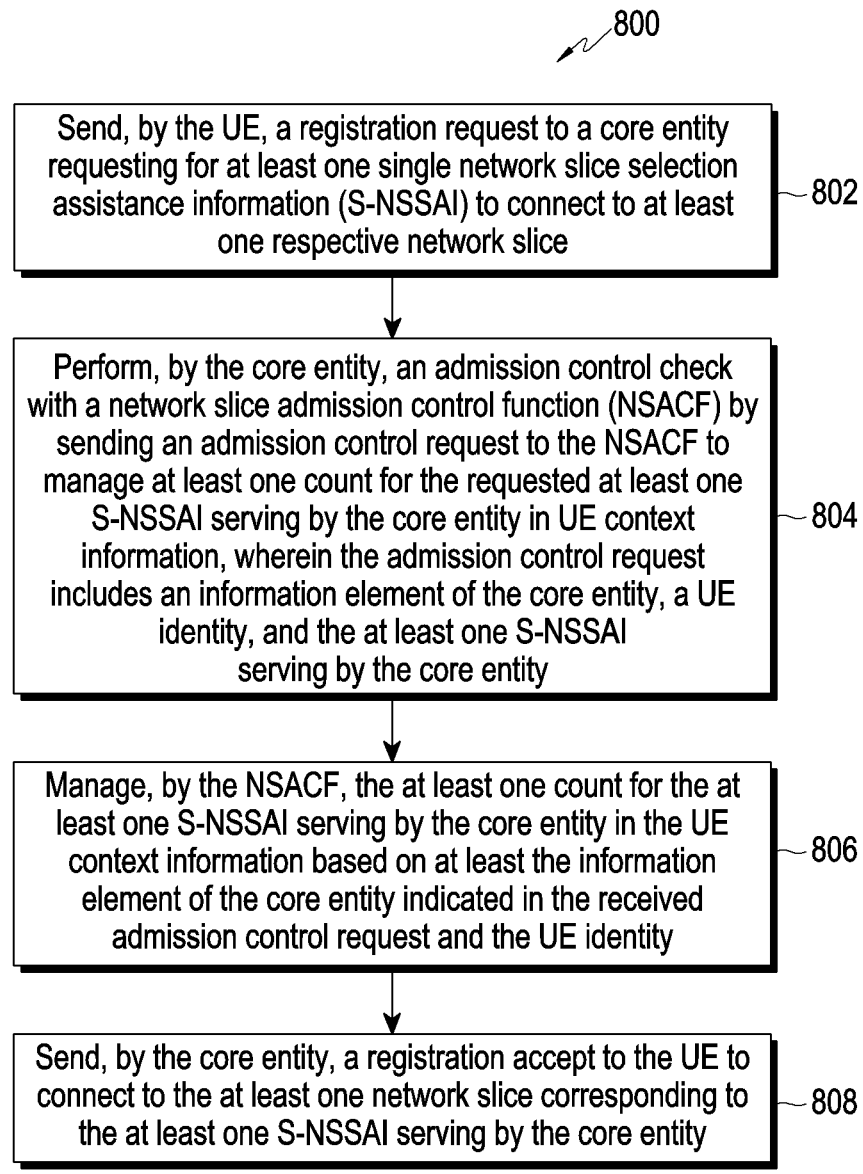
FIG. 8 is a flow chart depicting a method for managing network slice admission control for the UE, according to an embodiment of the disclosure.

FIG. 8 is a flow chart 800 depicting a method for managing network slice admission control for the UE 402, according to an embodiment of the disclosure.

Referring to FIG. 8, at operation 802, the method includes sending, by the UE 402, the registration request to the core entity (406a-406n) requesting for the at least one S-NSSAI to connect to the at least one respective network slice.

At operation 804, the method includes performing, by the core entity (406a-406n), the admission control check with the NSACF 408 by sending the admission control request to the NSACF 408 to manage the at least one count for the requested at least one S-NSSAI serving by the core entity (406a-406n) in the UE context information. The admission control request includes the information element of the core entity (406a-406n), the UE identity, and the at least one S-NSSAI serving by the core entity (406a-406n).

At operation 806, the method includes managing, by the NSACF 408, the at least one count for the at least one S-NSSAI serving by the core entity (406a-406n) in the UE context information based on the at least the information element of the core entity indicated in the received admission control request and the UE identity.

At operation 808, the method includes sending, by the core entity, the registration accept to the UE 402 to connect to the at least one network slice corresponding to the at least one S-NSSAI serving by the core entity (406a-406n). The various actions in the method of flow chart 800 may be performed in the order presented, in a different order or simultaneously. Further, in some embodiments, some actions listed in FIG. 8 may be omitted.

Figure 9:
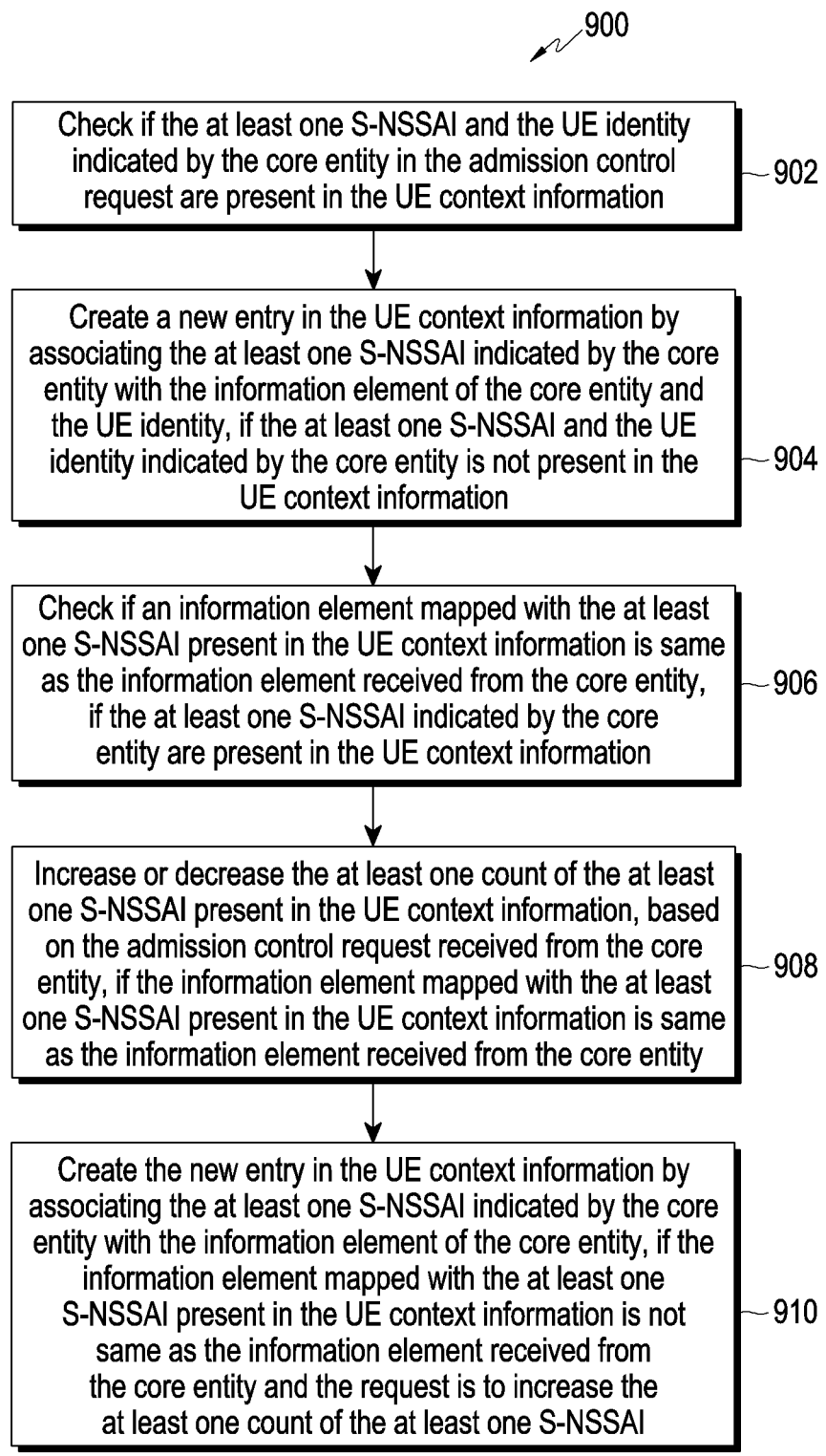
FIG. 9 is a flow chart depicting a method for managing the at least one count for the at least one S-NSSAI serving by the core entity in the UE context information, according to an embodiment of the disclosure.

FIG. 9 is a flow chart 900 depicting a method for managing the at least one count for the at least one S-NSSAI serving by the core entity (406a-406n) in the UE context information, according to an embodiment of the disclosure.

Referring to FIG. 9, at operation 902, the method includes checking, by the NSACF 408, if the at least one S-NSSAI and the UE identity indicated by the core entity (406a-406n) in the admission control request are present in the UE context information. If the at least one S-NSSAI and the UE identity indicated by the core entity are not present in the UE context information, at operation 904, the method includes creating, by the NSACF 408, the new entry in the UE context information by associating the at least one S-NSSAI indicated by the core entity (406a-406n) with the information element of the core entity (406a-406n) and the UE identity.

If the at least one S-NSSAI and the UE identity indicated by the core entity are present in the UE context information, at operation 906, the method includes checking, by the NSACF 408, if the information element mapped with the at least one S-NSSAI present in the UE context information is same as the information element received from the core entity (406a-406n).

At operation 908, if the information element mapped with the at least one S-NSSAI present in the UE context information is same as the information element received from the core entity (406a-406n), the method includes increasing or decreasing, by the NSACF 408, the at least one count of the at least one S-NSSAI present in the UE context information based on the admission control request received from the core entity (406a-406n).

If the information element mapped with the at least one S-NSSAI present in the UE context information is not same as the information element received from the core entity (406a-406n) and the request is to increase the at least one count of the at least one S-NSSAI, at operation 910, the method includes creating, by the NSACF 408, the new entry in the UE context information by associating the at least one S-NSSAI indicated by the core entity (406a-406n) with the information element of the core entity (406a-406n) and the UE identity. The various actions in the method of flow chart 900 may be performed in the order presented, in a different order or simultaneously. Further, in some embodiments, some actions listed in FIG. 9 may be omitted.

Figure 10:
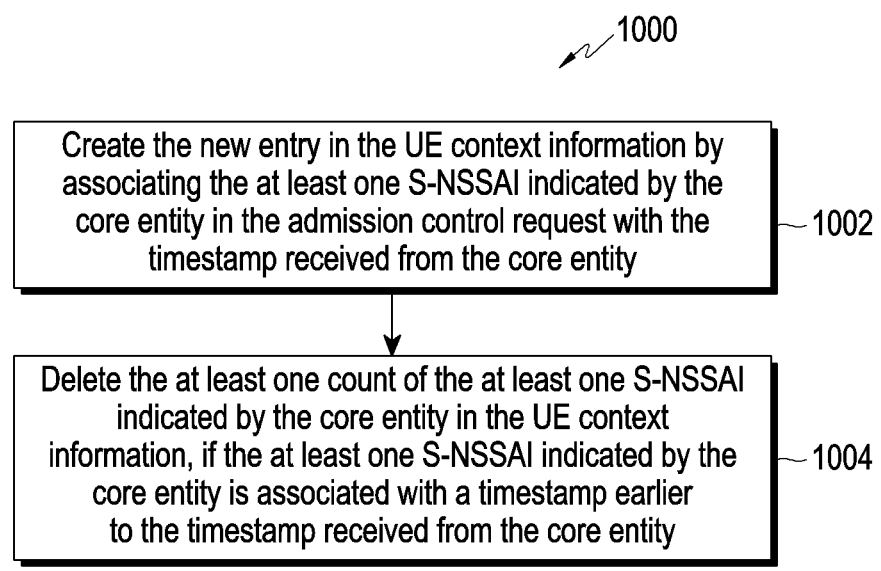
FIG. 10 is a flow chart depicting a method for managing the at least one count for the at least one S-NSSAI serving by the core entity in the UE context information, if the information element of the core entity includes the timestamp, according to an embodiment of the disclosure.

FIG. 10 is a flow chart 1000 depicting a method for managing the at least one count for the at least one S-NSSAI serving by the core entity (406a-406n) in the UE context information, if the information element of the core entity (406a-406n) includes the timestamp, according to an embodiment of the disclosure.

At operation 1002, the method includes creating, by the NSACF 408, the new entry in the UE context information by associating the at least one S-NSSAI indicated by the core entity (406a-406n) in the admission control request with the timestamp received from the core entity (406a-406n).

At operation 1004, the method includes deleting, by the NSACF 408, the at least one count of the at least one S-NSSAI indicated by the core entity (406a-406n) in the UE context information, if the at least one S-NSSAI indicated by the core entity (406a-406n) is associated with the timestamp earlier than the timestamp received from the core entity (406a-406n). The various actions in the method of flow chart 1000 may be performed in the order presented, in a different order or simultaneously. Further, in some embodiments, some actions listed in FIG. 10 may be omitted.

Figure 11:
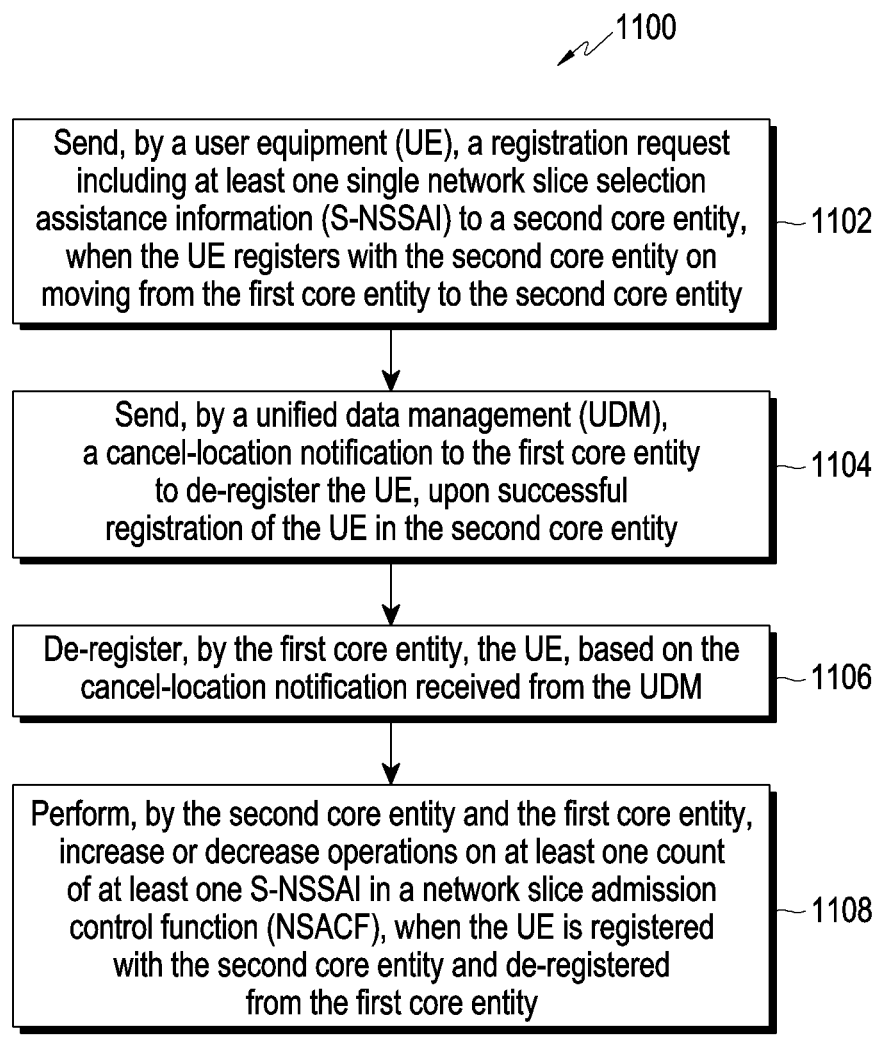
FIG. 11 is a flow chart depicting a method for performing the admission control check by the core entities with the NSACF, according to an embodiment of the disclosure.

FIG. 11 is a flow chart 1100 depicting a method for performing the admission control check by the core entities (406a-406n) with the NSACF 408, according to an embodiment of the disclosure.

Referring to FIG. 11, at operation 1102, a second core entity (for example, 406b), receives the registration request including the at least one S-NSSAI from the UE 402, when the UE 402 registers with the second core entity 406b on moving from a first core entity (for example, 406a) to the second core entity 406b. The at least one S-NSSAI may be requested by the UE 402 to connect to the at least one respective network slice.

At operation 1104, the UDM 410 sends the cancel-location notification or the deregistration notification to the first core entity 406a to de-register the UE 402, upon successful registration of the UE 402 in the second core entity 406b.

At operation 1106, the first core entity 406a de-registers the UE 402 based on the cancel-location notification received from the UDM 410.

At operation 1108, the second core entity 406b, and the first core entity 406a perform increase or decrease operations on the at least one count of the at least one S-NSSAI in the NSACF 408, when the UE 402 is registered with the second core entity 406b and de-registered from the first core entity 406a, respectively. The various actions in the method of flow chart 1100 may be performed in the order presented, in a different order or simultaneously. Further, in some embodiments, some actions listed in FIG. 11 may be omitted.

Embodiments herein describe the management of the network slice admission control for the UE 402 by considering the core entities 406a-406n as the AMFs 406a-406n as an example, but it may be obvious to a person skilled in the art any other or next generation core entities may be considered.

Figure 12A:
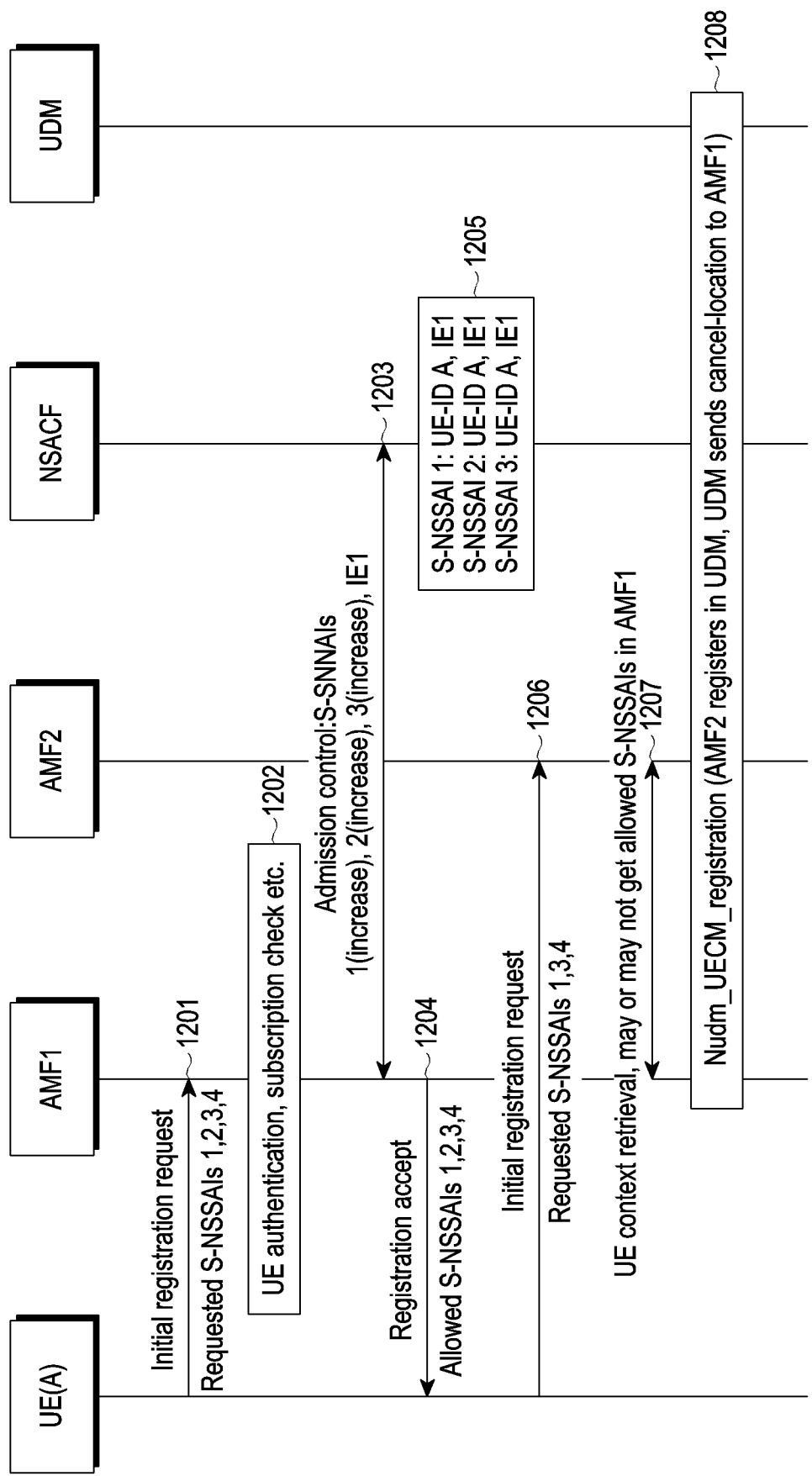
FIGS. 12A and 12B are a sequence diagram depicting managing the network slice admission control for the UE, according to various embodiments of the disclosure.
Figure 12B:
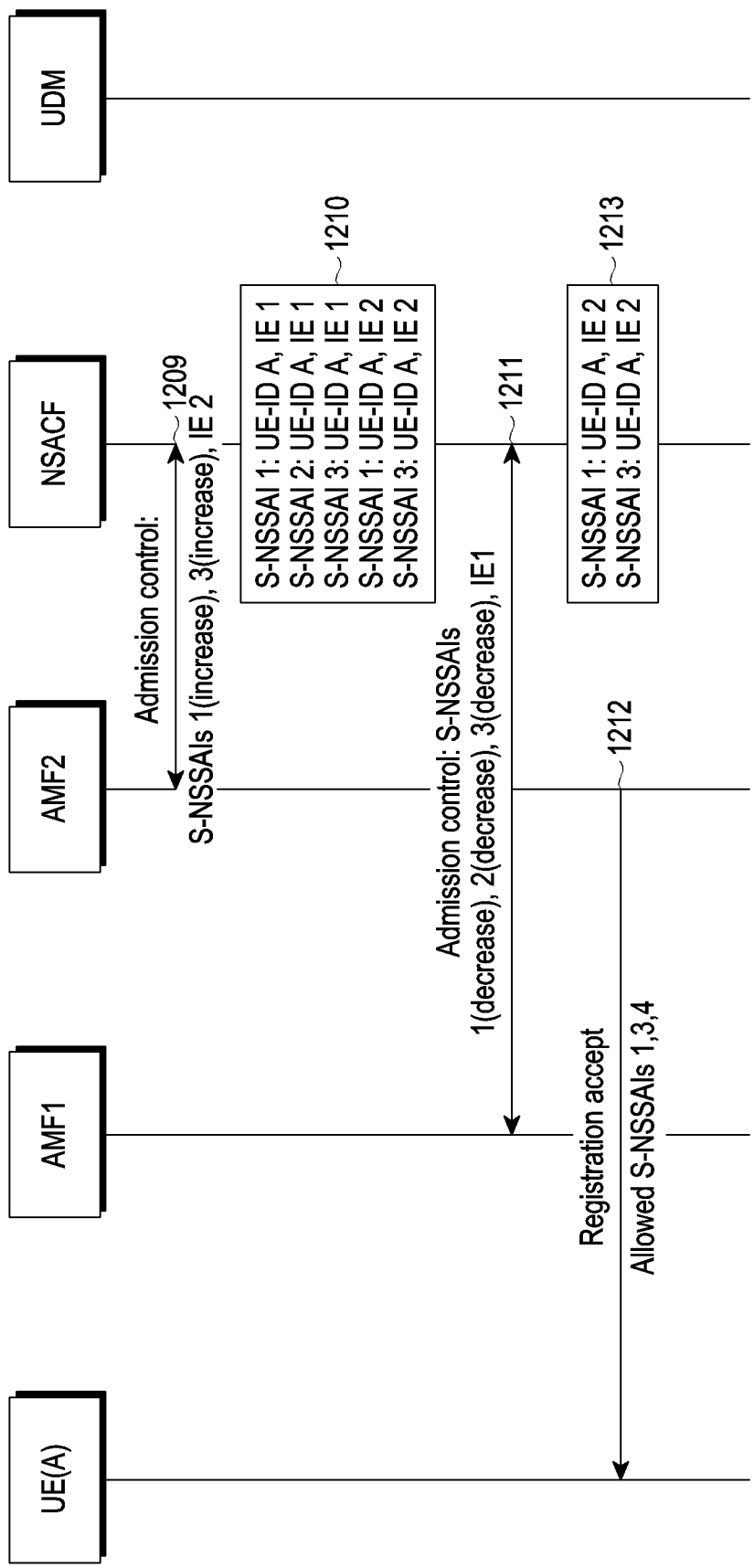

FIGS. 12A and 12B is a sequence diagram depicting managing the network slice admission control for the UE 402, according to various embodiments of the disclosure.

Referring to FIGS. 12A and 12B, at operation 1201, the UE (for example, a UE (A)) sends the registration request to the AMF1 (e.g., the AMF 406a). The registration request includes the S-NSSAIs for example, S-NSSAIs 1, 2, 3, 4 requested by the UE (A), wherein the S-NSSAIs indicate the network slices the UE (A) wants to connect to.

At operation 1202, the AMF1 authenticates the UE (A), registers itself in the UDM 410 by performing the Nudm_UECM_Registration procedure and performs the subscription check to determine if the UE (A) is allowed to access the requested S-NSSAIs 1, 2, 3, 4. In an example herein, consider that the UE (A) is allowed to access all the requested S-NSSAIs 1, 2, 3, 4. The AMF 1 also determines that the S-NSSAIs 1, 2, 3 require the network slice admission control, whereas the S-NSSAI 4 does not require the network slice admission control.

At operation 1203, the AMF1 performs the admission control check with the NSACF 408 by sending the admission control request to verify if a usage of the S-NSSAI 1, 2, 3 is under the configured limits. The admission control request includes the information element of the AMF1 (for example, an IE1), the UE identity (UE (A)) and the S-NS-SAIs 1, 2, 3 for which the count has to be updated. In an example herein, consider that the usage of all the S-NSSAIs 1, 2, 3 are within the configured limits. In such a scenario, the count has to be increased by 1 for all the S-NSSAIs 1, 2, 3.

At operation 1204, the AMF1 sends the registration accept to the UE (A) with the allowed S-NSSAIs containing the S-NSSAIs 1, 2, 3, 4.

At operation 1205, the NSACF 408 creates the new entry in the UE context information in the NSACF database, since an entry for the S-NSSAIs 1, 2, 3 with respect to the IE 1 is not present in the UE context information. The new entry includes the mapping of the UE (A) with the S-NSSAIs 1, 2, 3 and the IE1.

At operation 1206, the UE (A) performs a fresh initial registration in the AMF2 (for example with the SUCI, the 5G-GUTI, or any other identifier) and sends the requested S-NSSAIs containing the S-NSSAIs 1, 3, 4 to the AMF2.

At operation 1207, the AMF2 may or may not be able to retrieve the context of the UE (UE context) from the AMF2.

At operation 1208, the AMF2 registers itself into the UDM 410 by performing the Nudm_UECM_Registration procedure. Registering by the AMF2 into the UDM 410 triggers the UDM 410 to send the cancel-location (Nudm_UECM_DeregistrationNotification) message/notification to the AMF1, informing the AMF1 to locally delete the UE context corresponding to the UE (A).

At operation 1209, the AMF2 performs the admission control check with the NSACF 408 by sending the admission control request to the NSACF 408 to increase the counts for the S-NSSAI 1, 3. The admission control request includes the information element of the AMF2 (for example, an IE2), the UE identity (UE (A)), and the S-NSSAI 1, 3 for which the count has to be increased. The NSACF 408 accepts the admission control request from the AMF2 to increase/update the counts for the S-NSSAI 1, 3.

At operation 1210, the NSACF 408 does not increase the count of the S-NSSAIs 1, 3, since the NSACF database has the UE (A) counted against the S-NSSAIs 1, 3 with respect to the different information element (i.e., the IE1 of the AMF1). However, the NSACF 408 creates the new entry in the UE context information in the NSACF database by associating the S-NSSAIs 1, 3 with the IE2, and the UE (A).

At operation 1211, the AMF1 determines to deregister the UE (A) from the associated database, since the AMF1 has received the cancel-location (Nudm_UECM_DeregistrationNotification) message from the UDM 410 in operation 1208, or because the UE (A) has not been performed any activity in the AMF1 for a long time (for example, no periodic Tracking Area Update (TAU)). On deregistering the UE (A), the AMF1 triggers the admission control request to the NSACF 408 for decrementing counts for all the S-NSSAIs (1, 2, 3) in the UE context information, which have been previously served by the AMF1 for the UE 402. The admission control request also includes the information element of the AMF1 (IE1), the UE (A), and the S-NSSAIs 1, 2, 3 for which the count has to be decremented.

At operation 1212, the AMF2 sends the registration accept to the UE 402 indicating the allowed S-NSSAIs containing the S-NSSAI 1, 3, 4. The operation 1212 may be performed before or after operation 1211.

On receiving the admission control request from the AMF1, at operation 1213, the NSACF 408 deletes the S-NSSAIs 1, 2, 3 in the UE context information present in the NSACF database with respect to the IE1. Thus, the NSACF database may have the UE (A) counted against only the S-NSSAIs 1, 3.

Figure 13A:
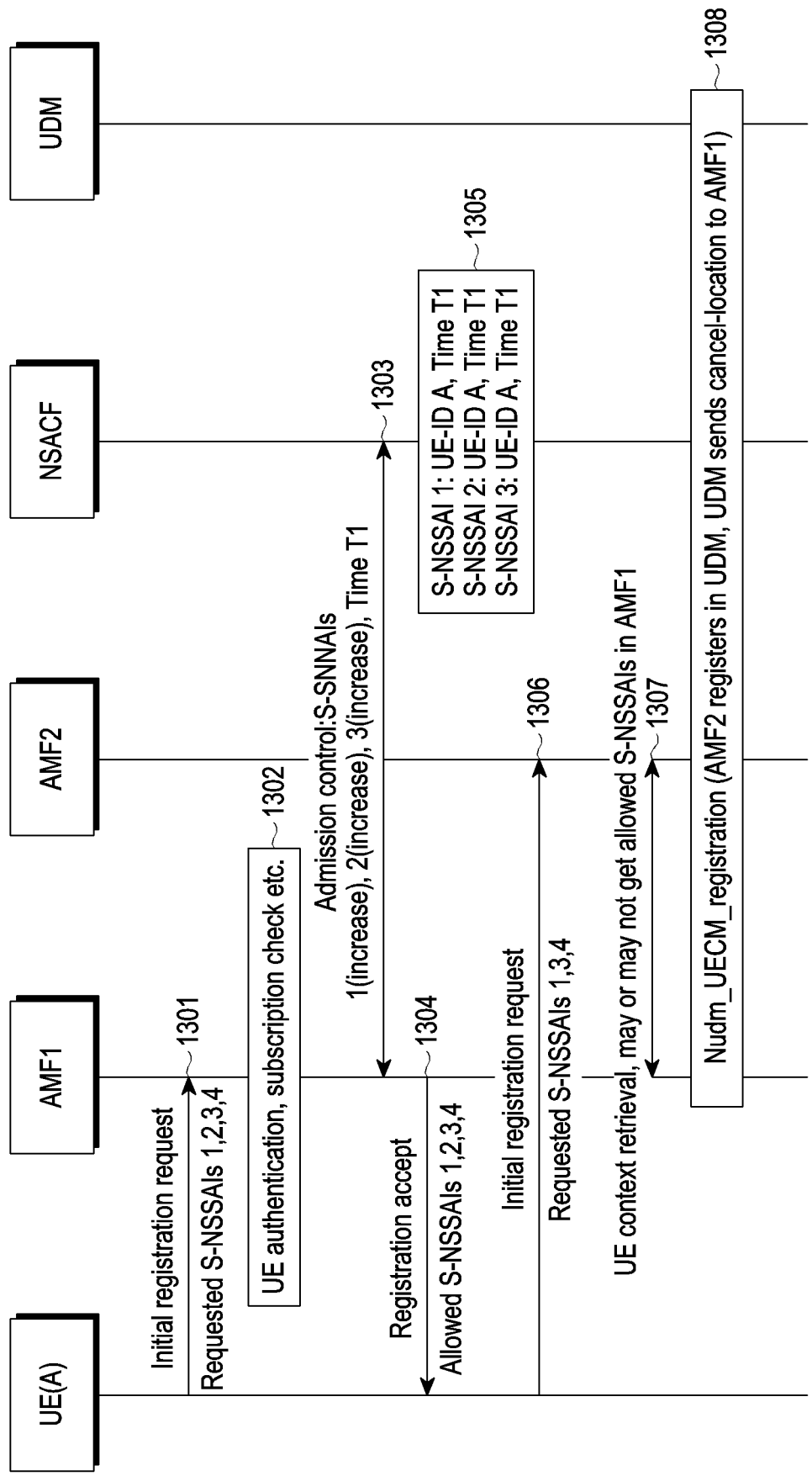
FIGS. 13A and 13B are a sequence diagram depicting managing of the network slice admission control for the UE, according to various embodiments of the disclosure.
Figure 13B:
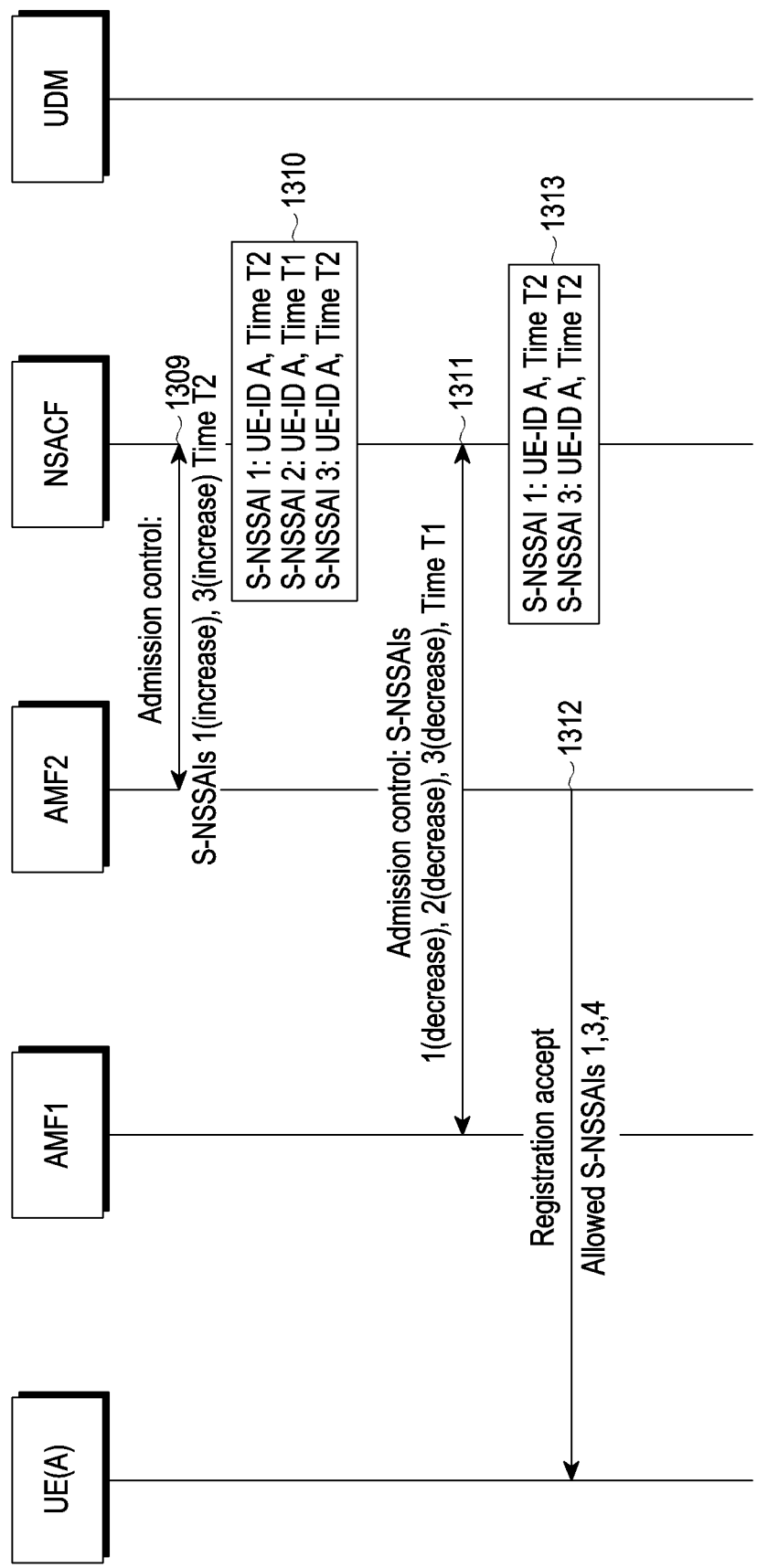

FIGS. 13A and 13B is a sequence diagram depicting managing of the network slice admission control for the UE 402, according to various embodiments of the disclosure.

Referring to FIGS. 13A and 13B, at operation 1301, the UE (for example, a UE (A)) sends the registration request to the AMF1 (e.g., the AMF 406a). The registration request includes the S-NSSAIs for example, S-NSSAIs 1, 2, 3, 4 requested by the UE (A), wherein the S-NSSAIs indicate the network slices the UE (A) wants to connect to.

At operation 1302, the AMF1 authenticates the UE (A), registers itself in the UDM 410 by performing a Nudm_UECM_Registration procedure and performs the subscription check to determine if the UE (A) is allowed to access the requested S-NSSAIs 1, 2, 3, 4. In an example herein, consider that the UE (A) is allowed to access all the requested S-NSSAIs 1, 2, 3, 4. The AMF1 also determines that the S-NSSAIs 1, 2, 3 require the network slice admission control, whereas the S-NSSAI 4 does not require the network slice admission control.

At operation 1303, the AMF1 performs admission control check with the NSACF 408 by sending the admission control request to verify if a usage of the S-NSSAI 1, 2, 3 is under the configured limits. The admission control request includes the information element of the AMF1 (for example, the timestamp T1 (i.e., the time of receiving Registration Request at AMF1 from the UE (A)), the UE identity (UE (A)) and the S-NSSAIs 1, 2, 3 for which the count has to be updated. In an example herein, the usage of all the S-NSSAIs 1, 2, 3 are within the configured limits. In such a scenario, the count has to be increased by 1 for all the S-NSSAIs 1, 2, 3.

At operation 1304, the AMF1 sends the registration accept to the UE (A) with the allowed S-NSSAIs containing the S-NSSAIs 1, 2, 3, 4.

At operation 1305, the NSACF 408 creates the new entry in the UE context information in the NSACF database, since an entry for the S-NSSAIs 1, 2, 3 with respect to the timestamp T1 is not present in the UE context information. Thus, the NSACF database has the UE (A) counted against the S-NSSAIs 1, 2, 3, with the timestamp T1 stored for each S-NSSAI.

At operation 1306, the UE 402 performs the fresh initial registration in the AMF2 (with the SUCI, the 5G-GUTI, or any other identifier) and sends the requested S-NSSAI containing the S-NSSAIs 1, 3, 4.

At operation 1307, the AMF2 may or may not be able to retrieve the UE context from the AMF1.

At operation 1308, the AMF2 registers itself into the UDM 410 by performing the Nudm_UECM_Registration procedure, which triggers the UDM 410 to send the cancel-location (Nudm_UECM_DeregistrationNotification) message to the AMF1, informing the AMF1 to locally delete the UE context corresponding to UE (A).

Referring to FIGS. 13A and 13B, at operation 1309, the AMF2 performs the admission control check with the NSACF 408 by sending the admission control request to the NSACF 408 to increase the counts for the S-NSSAI 1, 3. The admission control request also includes a timestamp T2 (the information element of the AMF2), that is the time of the AMF2 received the Registration Request from the UE 402. Since T2>T1, the NSACF 408 may safely assume that the AMF2 now holds the UE's context. The NSACF 408 accepts the admission control request to increase/update counts for the S-NSSAIs 1, 3 at operation 1310. However, since the UE (A) is already counted against the S-NSSAIs 1, 3, the NSACF 408 does not increase the count, but updates the NSACF database with the timestamp T2.

At operation 1311, the AMF1 determines to de-register the UE (A) from the associated database, since the AMF1 has received the cancel-location (Nudm_UECM_DeregistrationNotification) message from the UDM 410 in operation 1308, or because the UE (A) has not performed any activity in the AMF1 for a long time (for example, no periodic TAU). On deregistering the UE (A), the AMF1 triggers the admission control request to the NSACF 408 for decrementing counts for all the S-NSSAIs (1, 2, 3) in the UE context information, which have been previously served by the AMF1 for the UE 402. The admission control request also includes the information element of the timestamp T1, the UE (A), and the S-NSSAIs 1, 2, 3 for which the count has to be decremented. Since T1<T2, the NSACF 408 does not accept the admission control request to decrease the counts for the S-NSSAIs 1, 3. However the NSACF 408 accepts the admission control request to decrease the count for S-NSSAI 2 as the S-NSSAI 2 still has the timestamp T1.

At operation 1312, the AMF2 sends the registration accept to the UE 402 with the allowed S-NSSAIs containing the S-NSSAIs 1, 3, 4. The operation 1312 may be performed before or after operation 1311.

At operation 1313, the NSACF database has the UE (A) counted against the S-NSSAIs 1, 3 with the timestamp T2, which may be aligned with the allowed S-NSSAIs provided to the UE 402. Thus, there may be no under counting or over counting of the parameter "number of terminals."

Embodiments herein relate generally to network slicing in 3GPP, and more particularly, to a system and method of ensuring that 5G system is able to accurately enforce quota on a maximum number of UEs concurrently registering for a network slice defined by an S-NSSAI. Embodiments disclosed herein describe how the limits of "number of terminals" configured for an S-NSSAI may be accurately maintained in the NSACF, and thus the enforcement may be done when the limit is really exhausted. Embodiments disclosed herein also describe that a deregistration notification from UDM may act as a trigger for an old AMF to decrement counts in the NSACF as the old AMF is no longer serving the UE.

Embodiments herein disclose systems and methods for ensuring that the 5G network is able to accurately enforce quota on the maximum number of UEs concurrently registering for a network slice defined by an S-NSSAI.

Embodiments herein include a new information element in the message that an AMF sends to the NSACF for requesting admission control. The information is the time of last NAS-connection with the UE. That is, the AMF provides the NSACF with a timestamp which indicates the last time the AMF communicated with the UE over NAS.

Embodiments herein include an alternate new information element in the message that the AMF sends to the NSACF for requesting admission control. The information is an ID (e.g., AMF-ID) associated with the request. That is, the AMF provides the NSACF with an identification associated with the admission control request. The ID may be identification of the AMF initiating the request (e.g., a GUAMI, a network function (NF)-instance ID or any other ID uniquely identifying the AMF), or a timestamp, or a random number uniquely identifying the request.

Embodiments herein propose that both old and new AMFs perform increase and/or decrease operations in the NSACF when the UE is registered or de-registered from the 5G system. That is, if the old-AMF had increased counts for few S-NSSAIs in the NSACF, the old-AMF is also responsible for decreasing the counts for all those S-NSSAIs, after, for example, the UE moves to the new-AMF. Similarly, the new-AMF is responsible for increasing or decreasing the count only for the S-NSSAIs the new-AMF serves, not caring of what S-NSSAIs the UE was accessing in the old-AMF.

Embodiments herein disclose the NSACF, upon receiving the admission control request from AMFs, including a timestamp of last NAS-connection with UE, checks if the new request contains newer or same timestamp then the one stored, if any, in the NSACF database. The new request is accepted only if the timestamp is equal or newer, because the newer timestamp confirms that the UE is now being served by the new AMF.

Embodiments herein disclose an alternate method whereby the NSACF, upon receiving the admission control request from AMFs including the AMF-ID and/or another ID to identify the admission-control request, checks if the new request contains same ID as the one stored, if any, in the NSACF database. If the request is to increase count in NSACF, and the same entry for UE-A (including the same ID) already exists, the request is accepted without any changes to the database. If the request is to decrease count in NSACF, the request is accepted by deleting the corresponding entry in the database. If, however, the request is to increase count in NSACF, and an entry for UE-A already exists, but not associated to same ID, a new entry is created in the database, without deleting the entry corresponding to old-AMF. That is, the NSACF keeps old entry, associated with the old-AMF, intact. Entry associated with the old-AMF is deleted only upon receiving the decrease request from old-AMF itself. When using AMF-IDs, the NSACF may determine identification of AMF on its own, or it may be carried as an additional IE in admission-control request. This way, for a transient period, more than one entry for a UE (double-entry), however such an entry may get adjusted when the old-AMF performs decrease operation, after, e.g., implicit deregistration of the UE. While performing the admission-control, the NSACF may count such transient, double entries as one, as surely that UE is served by only one AMF in the network.

Embodiments herein disclose the NSACF, upon receiving the admission control request from the AMFs, without an additional IE (e.g., AMF-ID and/or timestamp or last NAS-connection), simply increases or decreases the counts in NSACF associated to that S-NSSAI. That is, the NSACF does not check if any entry corresponding to the UE is already present in the NSACF. This way, for a transient period, more than one entry for a UE (double-entry), however such an entry may get adjusted when the old-AMF performs decrease operation, after, e.g., implicit deregistration of the UE. While performing the admission-control, the NSACF may count such transient, double entries as one, as surely that UE is served by only one AMF in the network.

Embodiments herein disclose use of a cancel-location (Nudm_UECM_DeregistrationNotification) as a trigger for the AMF (e.g., old-AMF) to initiate admission-control procedure towards the NSACF, to decrease the usage count for the S-NSSAIs the AMF was serving.

In an embodiment, when the UE is implicitly deregistered (e.g., due to UE not performing Periodic Tracking Area Update), such an event acts as a trigger for the AMF (e.g., old-AMF) to initiate admission-control procedure towards NSACF, to decrease the usage count for the S-NSSAIs it was serving.

In an embodiment, the AMF stores the timestamp of last NAS connection with UE and/or identification used to send admission-control request into UE-context, so that the timestamp may be used while performing admission control with the NSACF. The timestamp or such ID need not be transferred to the new-AMF during the UE mobility though.

Figure 2:
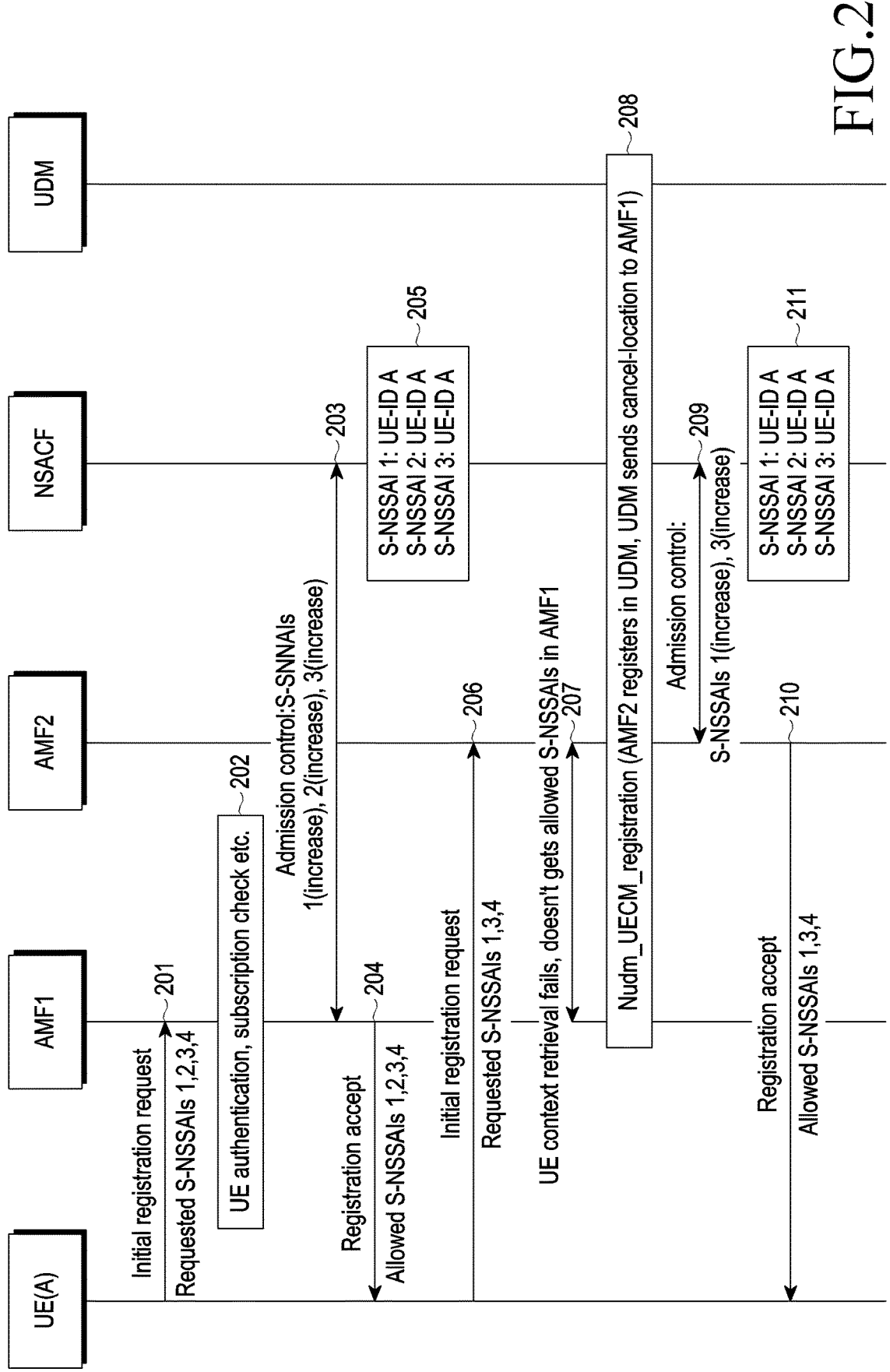
FIG. 2 is a representation of a sequence of events during AMF change scenario involving the admission control by the NSACF, highlighting over-counting in some scenarios, according to the related art.
Figure 3B:
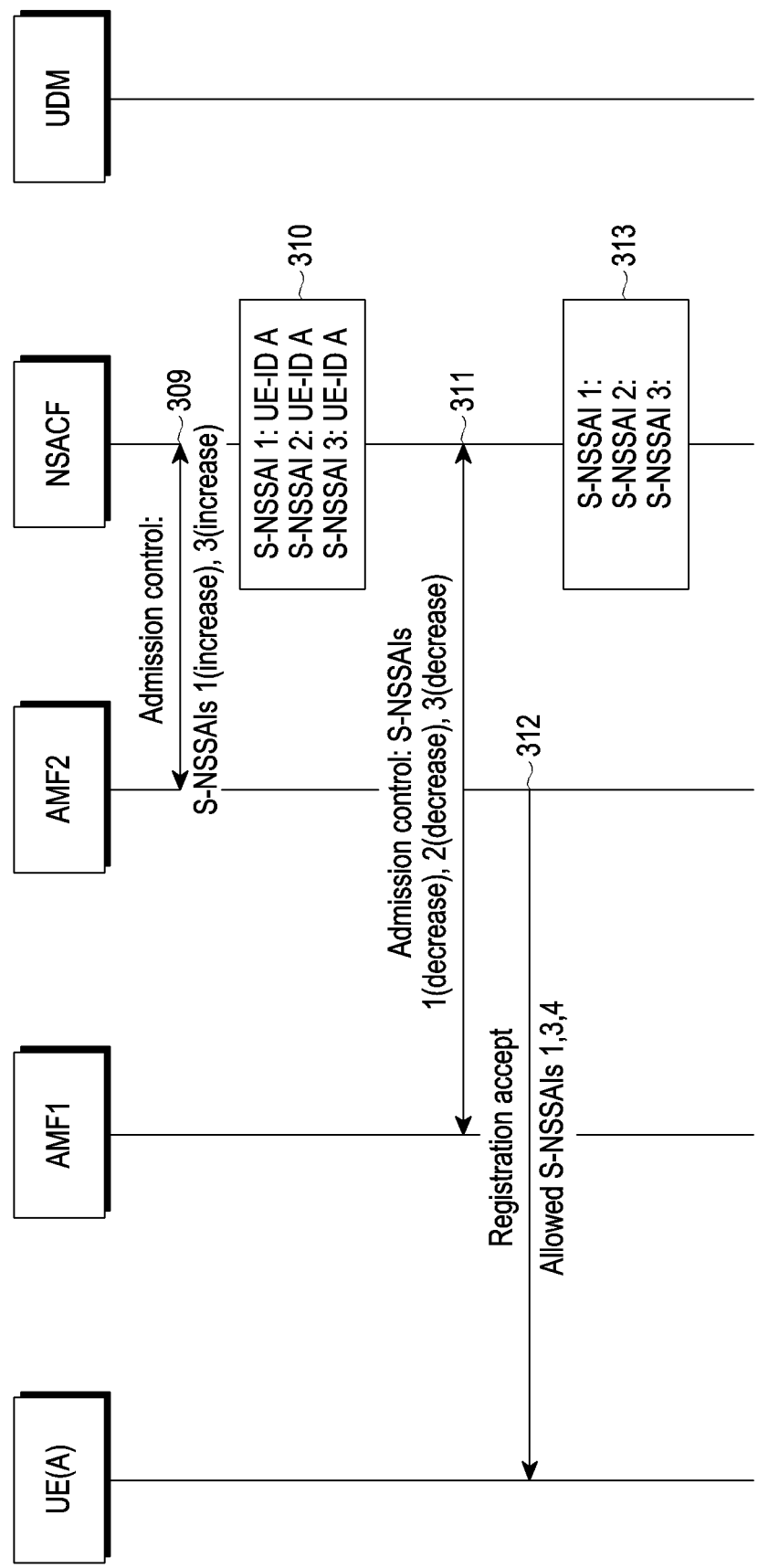

The embodiments disclosed herein can be implemented through at least one software program running on at least one hardware device and performing network management functions to control the elements. The elements shown in FIGS. 2, 3, and 4 can be at least one of a hardware device, or a combination of hardware device and software module.

The embodiments disclosed herein describe methods and systems for operating devices in an IoT environment. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in, e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be, e.g., hardware means like, e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the disclosure may be implemented on different hardware devices, e.g., using a plurality of CPUs.

While the disclosure has been shown and described with reference to various embodiments therefore, it will be understood by those skilled in the art that various changes in form and details may be made therein without departing from the spirit and scope of the disclosure as defined by the appended claims and their equivalents.

What is claimed is:

1. A method of an access and mobility management function (AMF) in a communication system, the method comprising:
   receiving, from user equipment (UE), a registration request; and
   performing a procedure for checking a number of UEs per a network slice based on receiving the registration request by sending a request related to a network slice admission control to a network slice admission control function (NSACF),
   wherein the request related to the network slice admission control includes an identity of the AMF, an identity of the UE, and at least one single-network slice selection assistance information (S-NSSAI).

2. The method of claim 1,
   wherein the identity of the AMF includes a network function (NF)-instance identifier (ID) of the AMF.

3. The method of claim 1, wherein the procedure for checking the number of UEs per a network slice is performed based on UE context information including the identity of the UE and a mapping of the number of UEs for the at least one S-NSSAI with the identity of the AMF.

4. The method of claim 1, further comprising:
   sending, to the UE, a registration accept to connect to the at least one network slice corresponding to the at least one S-NSSAI served by the AMF.

5. The method of claim 1, further comprising:
   if the UE has moved to another AMF from the AMF due to mobility for the at least one S-NSSAI, sending an admission control request including the identity of the AMF and the at least one S-NSSAI to the NSACF for the NSACF to decrease a number of UEs for the at least one S-NSSAI.

6. The method of claim 5, further comprising:
   deleting the number of UEs for the at least one S-NSSAI based on:
   an absence of at least one activity by the UE in the AMF for a pre-defined time, or
   a cancel-location notification or a deregistration notification received from a Unified Data Management (UDM) associated with the AMF.

7. The method of claim 1, further comprising:
   receiving, from a Unified Data Management (UDM), a de-registration notification or a cancel-location notification, upon successful registration of the UE in another AMF; and
   sending an admission control request including the identity of the AMF, the identity of the UE, and the at least one S-NSSAI previously served for the UE to initiate an admission check with the NSACF to decrease a number of UEs for the at least one S-NSSAI previously served for the UE, wherein the NSACF decreases the number of UEs for the at least one S-NSSAI previously served by the AMF in UE context information with respect to the identity of the AMF.

8. A method of a network slice admission control function (NSACF) in a communication system, the method comprising:
   receiving, from an access and mobility management function (AMF), a request related to a network slice admission control to check a number of UEs per a network slice based on the AMF receiving a registration request from a user equipment (UE),
   wherein the request related to the network slice admission control includes an identity of the AMF, an identity of the UE, and at least one single-network slice selection assistance information (S-NSSAI); and
   managing a number of UEs for the at least one S-NSSAI based on receiving the request related to the network slice admission control.

9. The method of claim 8,
   wherein the identity of the AMF includes
   a network function (NF)-instance identifier ID of the AMF.

10. The method of claim 8, wherein the managing of the number of UEs for the at least one S-NSSAI in UE context information including the identity of the UE and a mapping of the number of UEs for the at least one S-NSSAI with the identity of the AMF.

11. The method of claim 8, further comprising:
    checking if the at least one S-NSSAI and the identity of the UE are present in UE context information, and
    creating a new entry in the UE context information by associating the at least one S-NSSAI with the identity of the AMF, if the at least one S-NSSAI and the identity of the UE are not present in the UE context information.

12. The method of claim 11, further comprising:
if the at least one S-NSSAI and the identity of the UE are present in the UE context information, checking if an information element mapped with the at least one S-NSSAI present in the UE context information is same as an information element received from the AMF;
increasing or decrease the number of UEs for the at least one S-NSSAI in the UE context information, based on the request related to the network slice admission control received from the AMF, if the information element mapped with the at least one S-NSSAI present in the UE context information is same as the information element received from the AMF; and
creating the new entry in the UE context information by associating the at least one S-NSSAI with the information element of the AMF and the identity of the UE, if the information element mapped with the at least one S-NSSAI present in the UE context information is not same as the information element received from the AMF and the request is to increase the number of UEs for the at least one S-NSSAI.

13. The method of claim 8, further comprising:
receiving an admission control request from the AMF including the identity of the AMF, the identity of the UE, and the at least one S-NSSAI previously served by the AMF for the UE to decrease the number of the UEs for the at least one S-NSSAI, upon a successful registration of the UE in another AMF, and
decreasing the number of UEs for the at least one S-NSSAI previously served by the AMF in UE context information with respect to the identity of the AMF, and the identity of the UE.

14. An apparatus for an access and mobility management function (AMF) in a communication system, the apparatus comprising:
a memory; and
at least one processor coupled to the memory,
wherein the at least one processor is configured to:
receive, from a user equipment (UE), a registration request, and
perform a procedure for checking a number of UEs per a network slice based on receiving the registration request by sending a request related to a network slice admission control to a network slice admission control function (NSACF), and
wherein the request related to the network slice admission control includes an identity of the AMF, an identity of the UE, and at least one single-network slice selection assistance information (S-NSSAI).

15. The apparatus of claim 14, wherein the at least one processor is further configured to:
receive a de-registration notification or a cancel location from a Unified Data Management (UDM), upon successful registration of the UE in another AMF, and
send an admission control request including the identity of the AMF, the identity of the UE, and the at least one S-NSSAI previously served for the UE to initiate an admission check with the NSACF to decrease a number of the UEs for the at least one S-NSSAI, wherein the NSACF decreases the number of UEs for the at least one S-NSSAI previously served by the AMF in UE context information with respect to the identity of the AMF.

16. An apparatus for a network slice admission control function (NSACF) in a communication system, the apparatus comprising:
a memory; and
at least one processor coupled to the memory,
wherein the at least one processor is configured to:
receive, from an access and mobility management function (AMF), a request related to a network slice admission control to check a number of UEs per a network slice based on the AMF receiving a registration request from a user equipment (UE), wherein the request related to the network slice admission control includes an identity of the AMF, an identity of the UE, and at least one single-network slice selection assistance information (S-NSSAI), and
manage a number of UEs for the at least one S-NSSAI based on receiving the request related to the network slice admission control.

17. The apparatus of claim 16, wherein the at least one processor is further configured to:
check if the at least one S-NSSAI and the identity of the UE are present in UE context information;
create a new entry in the UE context information by associating the at least one S-NSSAI with the identity of the AMF, if the at least one S-NSSAI and the identity of the UE are not present in the UE context information;
if the at least one S-NSSAI and the identity of the UE are present in the UE context information, check if an information element mapped with the at least one S-NSSAI present in the UE context information is same as an information element received from the AMF;
increase or decrease the number of UEs for the at least one S-NSSAI in the UE context information, based on the request related to the network slice admission control received from the AMF, if the information element mapped with the at least one S-NSSAI present in the UE context information is same as the information element received from the AMF; and
create the new entry in the UE context information by associating the at least one S-NSSAI with the information element of the AMF and the identity of the UE, if the information element mapped with the at least one S-NSSAI present in the UE context information is not same as the information element received from the AMF and the request is to increase the number of UEs for the at least one S-NSSAI.

18. The apparatus of claim 16, wherein the at least one processor is further configured to:
receive an admission control request from the AMF including the identity of the AMF, the identity of the UE, and the at least one S-NSSAI previously served by the AMF for the UE to decrease the number of UEs for the at least one S-NSSAI, upon a successful registration of the UE in another AMF, and
decrease the number of UEs for the at least one S-NSSAI previously served by the AMF in UE context information with respect to the identity of the AMF, and the identity of the UE.

* * * * *